(12) United States Patent
Thorogood et al.

(10) Patent No.: US 12,492,823 B2
(45) Date of Patent: Dec. 9, 2025

(54) COOKING APPLIANCE

(71) Applicant: Breville Pty Limited, Alexandria (AU)

(72) Inventors: Michael Thorogood, Alexandria (AU); Emma Larkin, Alexandria (AU); Marian Silviu Rosian, Alexandria (AU); Byron Ashley Marsh-Croft, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 950 days.

(21) Appl. No.: 17/279,093

(22) PCT Filed: Sep. 25, 2019

(86) PCT No.: PCT/AU2019/051030
§ 371 (c)(1),
(2) Date: Mar. 24, 2021

(87) PCT Pub. No.: WO2020/061628
PCT Pub. Date: Apr. 2, 2020

(65) Prior Publication Data
US 2021/0388992 A1 Dec. 16, 2021

(30) Foreign Application Priority Data

Sep. 25, 2018 (AU) ................................ 2018903601
May 6, 2019 (AU) ................................ 2019901534
Sep. 6, 2019 (AU) ................................ 2019903296

(51) Int. Cl.
*F24C 15/00* (2006.01)
*A21B 1/14* (2006.01)
(Continued)

(52) U.S. Cl.
CPC .............. *F24C 15/006* (2013.01); *A21B 1/14* (2013.01); *A21B 1/22* (2013.01); *F24C 7/046* (2013.01)

(58) Field of Classification Search
CPC .... F24C 7/04; F24C 7/06; F24C 7/046; A21B 1/14; A21B 1/22; H05B 1/0263;
(Continued)

(56) References Cited

U.S. PATENT DOCUMENTS 2,938,989 A * 5/1960 Smith ...................... H05B 3/76
219/454.12
3,511,971 A 5/1970 Keating
(Continued)

FOREIGN PATENT DOCUMENTS

CH 625032 A5 8/1981
CN 108158428 A 6/2018
(Continued)

OTHER PUBLICATIONS

International Search Report for Australian Application No. PCT/AU2019/051030, dated Jan. 30, 2020.
(Continued)

*Primary Examiner* — Chris Q Liu
*Assistant Examiner* — James F Sims, III
(74) *Attorney, Agent, or Firm* — KDW FIRM PLLC

(57) ABSTRACT

A cooking appliance (400) including: a body (402) providing a floor (404), a ceiling (406) and an intermediate wall (408) located between the floor (404) and ceiling (406), the floor (404), ceiling (406), and wall (408) at least partly surrounding a cooking cavity (410), the body (402) having an opening (412) via which product to be cooked can be moved relative to the cavity (410); a heating element (420) located in the cavity (410) to deliver radiant energy to cook the product; a cooling system (434) coupled to the body
(Continued)

(402), the cooling system (434) including an airflow channel (436) communicating with a cold pin section (424) of the heating element (420), the airflow channel (436) configured to direct airflow to the cold pin section (424) to selectively cool the cold pin section (424); and a shield (444) positioned relative to the cold pin section (424) to shield the cavity (410) from at least a portion of the airflow.

7 Claims, 26 Drawing Sheets

(51) Int. Cl.
  *A21B 1/22* (2006.01)
  *F24C 7/04* (2021.01)
(58) Field of Classification Search
  CPC .......... H05B 1/0266; H05B 3/20; H05B 3/22; H05B 3/68; H05B 2203/002
  USPC ........................................................ 219/395
  See application file for complete search history.

(56) References Cited

U.S. PATENT DOCUMENTS

| | | | | |
|---|---|---|---|---|
| 5,051,561 | A | | 9/1991 | McWilliams |
| 5,153,413 | A | | 10/1992 | Wilde |
| 5,852,282 | A | * | 12/1998 | Moore ..................... H05B 3/68 |
| | | | | 219/454.12 |
| 6,008,478 | A | * | 12/1999 | Crone ....................... F24C 7/06 |
| | | | | 219/403 |
| 8,544,382 | B2 | * | 10/2013 | Zhao ................... A47J 37/0694 |
| | | | | 126/152 B |
| 2002/0036195 | A1 | | 3/2002 | Loveless |
| 2010/0322601 | A1 | * | 12/2010 | Springer ................... F24C 7/06 |
| | | | | 392/416 |
| 2013/0334197 | A1 | * | 12/2013 | Kim ....................... F24C 15/007 |
| | | | | 219/403 |
| 2018/0020680 | A1 | | 1/2018 | Froelicher et al. |
| 2018/0328592 | A1 | * | 11/2018 | Springer ............... F24C 15/102 |
| 2020/0063972 | A1 | * | 2/2020 | Song ........................ F24C 7/062 |
| 2020/0063977 | A1 | * | 2/2020 | Song ........................ F24C 7/067 |

FOREIGN PATENT DOCUMENTS

| | | |
|---|---|---|
| DE | 102016108299 A1 | 11/2016 |
| EP | 1083773 A2 | 3/2001 |
| EP | 1170550 A1 | 1/2002 |
| EP | 1767860 B1 | 3/2007 |
| EP | 2943044 A1 | 11/2015 |
| EP | 3351856 A4 | 9/2018 |
| JP | 2005078823 A | 3/2005 |
| JP | 2018198845 A | 12/2018 |
| KR | 20050063969 A | 6/2005 |
| WO | WO-2017097209 A1 | 6/2017 |

OTHER PUBLICATIONS

European Search Report and Written Opinion for Application No. EP19865331 mailed Sep. 8, 2022, 11 pages.

* cited by examiner

COOKING APPLIANCE

FIELD

The present invention relates to cooking appliances, and more particularly, but not exclusively to, heating elements and flexible electrical couplings for use in cooking appliances for cooking pizza. The present invention also relates to a deck for use in an appliance for cooking pizza.

BACKGROUND

Appliances used to cook pizza, such as an oven, provide for circulation of heat around a cavity or chamber within which the pizza is being cooked. The oven typically includes a deck in the form of a pizza stone located within the cavity for receiving the pizza, and one or more heating elements positioned within the cavity to radiate heat around the cavity to cook the pizza.

A heating element of such ovens typically comprise two half-portions which have different watt densities (defined by the rated wattage per unit of the heating element surface area). Excessively high watt densities may result in degradation or failure of the heating element, particularly with prolonged use. The arrangement of such heating elements relative to the deck may also result in uneven transfer or distribution of heat from the heating elements around the deck.

The oven also typically includes a flexible electrical coupling to provide power to a lower heating element that is associated with the deck. One end of the flexible electrical coupling is coupled to the heating element and the deck, whilst the other end of the flexible electrical coupling is coupled to a power source via a platform or floor of the cavity. The deck is linked to the door of the oven such that when the door is opened, the deck moves with the door and travels out of the cavity. Repeated movement of the deck in and out of the cavity also results in repeated deformation (tensioning and compression) of the flexible electrical coupling connected thereto.

The radiated heat in such ovens is also typically at an intense level. Under such high heat levels, the stone (i.e. the pizza deck) may be susceptible to cracking due to different temperature gradients around the stone, leading to concentrations of stress around the stone.

The cold pin section of the heating element is typically cooled to minimise damage caused by heat leakage from the heat conducting portion of the heating element. Disadvantageously, whilst the cold pin section benefits from cooling, the temperature of the cavity may also be affected.

SUMMARY

It is an object of the present invention to substantially overcome, or at least ameliorate, one or more of the above disadvantages.

There is disclosed herein a cooking appliance including:
a body providing a floor, a ceiling and an intermediate wall locating between the floor and ceiling, the floor, ceiling, and wall at least partly surrounding a cooking cavity, the body having an opening via which product to be cooked can be moved relative to the cavity;
a heating element located in the cavity to deliver radiant energy to cook the product;
a cooling system coupled to the body, the cooling system including an airflow channel communicating with a cold pin section of the heating element, the airflow channel configured to direct airflow to the cold pin section to selectively cool the cold pin section; and
a shield positioned relative to the cold pin section to shield the cavity from at least a portion of the airflow.

Preferably, the shield includes one or more walls at least partly surrounding a cooling area, wherein the cold pin section is located within the cooling area.

Preferably, the shield is configured to limit access to the cold pin section by a user.

Preferably, at least one of the walls is perforated.

Preferably, the shield is made of metal.

There is also disclosed herein a deck for use in a cooking appliance having a cooking cavity, an upper heating element located in an upper portion of the cooking cavity and a lower heating element located in a lower portion of the cooking cavity, the cooking cavity having a forward portion and a rear portion, the deck comprising:
a first portion adapted to receive heat from the upper and lower heating elements, the first portion having a planar upper surface and a periphery; and
a second portion having a planar upper surface and being located adjacent to the periphery of the first portion, the upper surfaces of the first and second portions being generally co-planar, with the first and second portions being at least partially separated by a slot.

Preferably, the slot extends from the planar upper surfaces of the first and second portions to planar lower surfaces of the first and second portions.

Preferably, the second portion includes a protrusion to engage a corresponding aperture on the first portion so as to secure the second portion to the first portion.

Preferably, the first portion at least partially overlays the second portion such that the slot is formed at an angle to the co-planar upper surfaces.

Preferably, the first portion includes a recess located on an underside of the first portion.

Preferably, the first portion has a forward segment and a rear segment, the forward segment having an arcuate edge and the rear segment having parallel side edges, with the periphery of the first portion being transverse of the parallel side edges.

There is also disclosed herein a cooking appliance having a heating element assembly to provide heat to a cooking cavity of the cooking appliance, the heating element assembly including:
a first heating element, a second heating element, and a third heating element,
the first and third heating elements at least partially surrounding an area within which the second heating element is located,
each of the heating elements including a first terminal end portion, a second terminal end portion, and a length extending between the first and second terminal end portions of the respective heating elements,
the length of each of the first and third heating elements including:
a first length portion extending from the respective first terminal end portion; and
a second length portion extending from the respective second terminal end portion to the respective first length portion so as to be located adjacent the respective first length portion.

Preferably, the length of each of the first and third heating elements further includes an arcuate end portion located between so as to connect the respective first and second length portions, and the first length portion extends along a first arcuate path from the respective first terminal end portion towards the arcuate end portion, and the second length portion extends along a second arcuate path from the arcuate end portion towards the respective second terminal end portion.

Preferably, the length of the third heating element is greater than the length of the first heating element.

Preferably, the arcuate end portion of the first heating element is opposite the arcuate end portion of the third heating element, with the arcuate end portion of the first heating element being spaced from the arcuate end portion of the third heating element.

Preferably, the second heating element provides an inner heating element sub-assembly and the first and third heating elements provide an outer heating element sub-assembly that is concentric with respect to the inner heating element sub-assembly.

There is also disclosed herein a cooking appliance having a heating element assembly to provide heat to a cooking cavity of the cooking appliance, the heating element assembly including:
  a first heating element, the element being of a coil configuration so as to provide at least two loops that surround an area, the element also having a first and a second terminal end portion; and
  a second heating element providing a loop located in said area, and having a first and a second terminal end portion.

Preferably, the first terminal end portion of the first heating element is located on a first plane, and the second terminal end portion of the first heating element and the terminal end portions of the second heating element are located on a second plane, with the first plane being located above the second plane.

Preferably, the first plane is spaced apart from the second plane.

The first plane may alternatively be located below the second plane.

Preferably, the two loops of the first heating element are coplanar with the loop of the second heating element, with each loop also being located on the first plane.

Preferably, the two loops of the first heating element and the loop of the second heating element are located above or below the second terminal end portion of the first heating element and the first and second terminal end portions of the second heating element.

There is also disclosed herein a cooking appliance having a heating element to provide heat to a cooking cavity of the cooking appliance, the heating element including:
  a first terminal end portion, a second terminal end portion, and a length extending between the first and second terminal end portions,
  the length including:
    a first length portion extending from the first terminal end portion towards a first arcuate end portion;
    a second length portion extending from the second terminal end portion towards a second arcuate end portion;
    a third length portion extending from the first arcuate end portion; and
    a fourth length portion extending from the second arcuate end portion towards a bridge portion that connects the third and fourth length portions;
  wherein:
    the first and second length portions are located between the third and fourth length portions,
    the third and fourth length portions each include a first sub-portion, a second sub-portion, and a third sub-portion,
    the first sub-portions extend from the bridge portion, with the first sub-portion of the third length portion and the first sub-portion of the fourth length portion each having a major direction of extension, with the major directions of extension being parallel,
    the second sub-portions diverge from the respective first sub-portions in opposite direction towards the respective third sub-portions, and
    the third sub-portions converge from the respective second sub-portions towards the respective arcuate end portions.

There is also disclosed herein a cooking appliance having a floor, a deck supported so as to be movable relative to the floor, a heating element supported by the deck and a flexible electrical coupling to provide power to the heating element, the flexible electrical coupling being elongated so as to have a longitudinal axis and opposite first and second end portions,
  the first end portion being fixed to the deck so as to remain stationary relative thereto,
  the second end portion being fixed to the floor so as to remain stationary relative thereto,
  the first end portion being angularly movable relative to the second end portion along an arcuate path,
  the first end portion including a first axis portion of the longitudinal axis, the first axis portion having a major direction of extension, and
  the second end portion including a second axis portion of the longitudinal axis, the second axis portion having a major direction of extension that remains parallel to the major direction of extension of the first axis portion.

BRIEF DESCRIPTION OF THE DRAWINGS

Preferred forms of the present invention will now be described, by way of example only, with reference to the accompanying drawings, in which:

FIG. 10 is a schematic isometric view of a flexible electrical coupling that couples the deck and the floor of the appliance of FIG. 1;

FIG. 30A is a schematic bottom view of the deck of FIG. 30A showing the temperature distribution thereof;

DETAILED DESCRIPTION OF EMBODIMENTS

Figure 1:
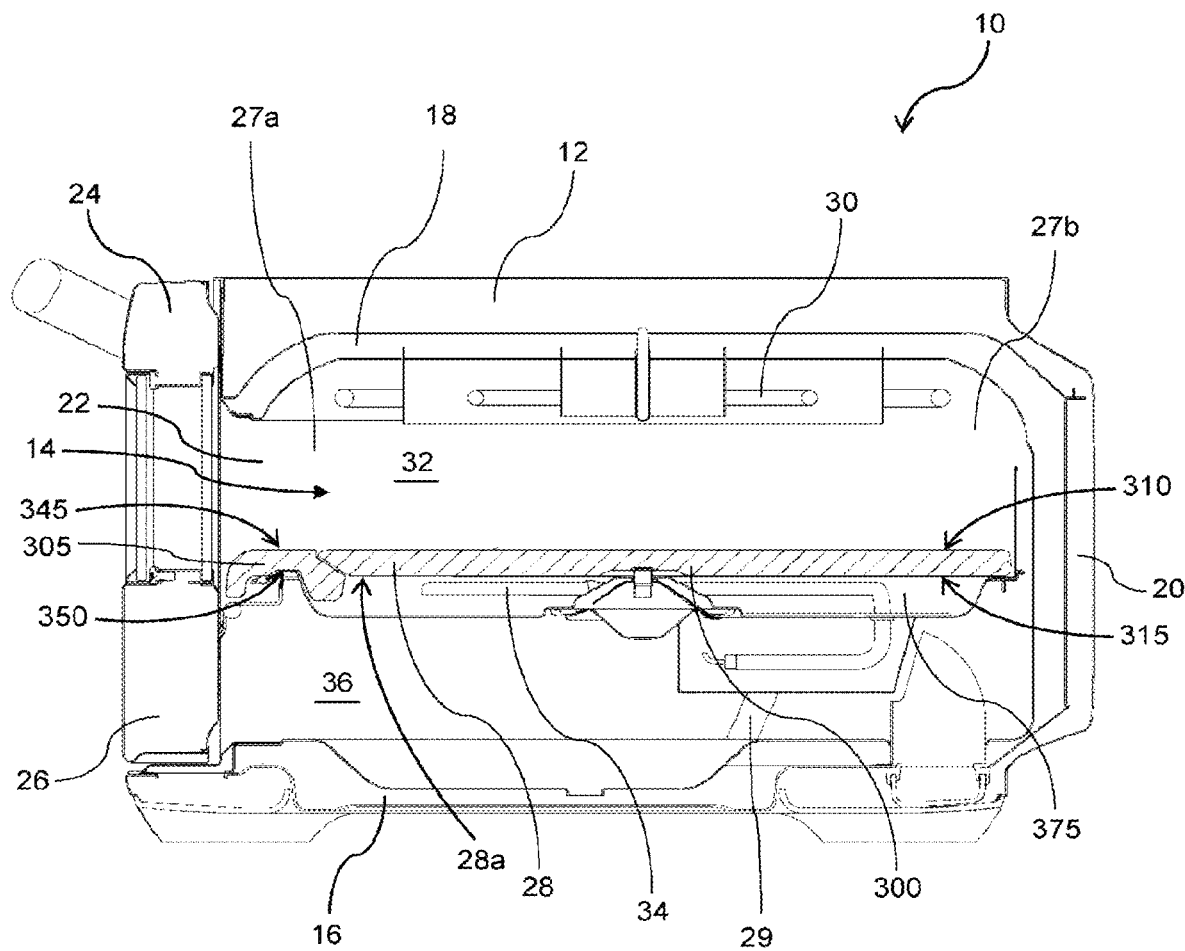
FIG. 1 is a schematic sectioned side view of a cooking appliance.

In FIG. 1 of the accompanying drawings, there is schematically depicted a cooking appliance 10 for cooking pizza or other suitable food items (not shown) having a body 12 that at least partially surrounds a cooking cavity 14. The body 12 includes a floor 16, a ceiling 18, and a wall 20 extending between the floor 16 and the ceiling 18. The body 12 also includes an opening 22 providing a passage through which the pizza to be cooked is to be moved in and out of the cooking cavity 14. The appliance 10 includes a door 24 enclosing the opening 22. The door 24 is hinged to the body 12 at a lower portion 26 of the door 24. The cooking cavity 14 includes a forward portion 27a adjacent to the door 24 and a rear portion 27b adjacent to the wall 20. The appliance 10 includes a deck 28 for receiving the pizza to be cooked. The deck 28 is supported by an arm 29 so as to be movable relative to the floor 16 along an arcuate path.

The appliance 10 further includes an upper heating element assembly 30 located in an upper portion 32 of the cooking cavity 14 and a lower heating element assembly 34 located in a lower portion 36 of the cooking cavity 14. The upper and lower heating element assemblies 30 and 34 are adapted to deliver heat (via convection, conduction or radiant energy) to cook the pizza. The upper heating element assembly 30 is mounted to and extends circumferentially around the ceiling 18 to deliver radiant energy to cook the pizza, whilst the lower heating element assembly 34 is supported by the deck 28 to transfer heat to the deck 28. In the depicted embodiment, the lower heating element assembly 34 is supported at an underside 28a of the deck 28.

Figure 2:
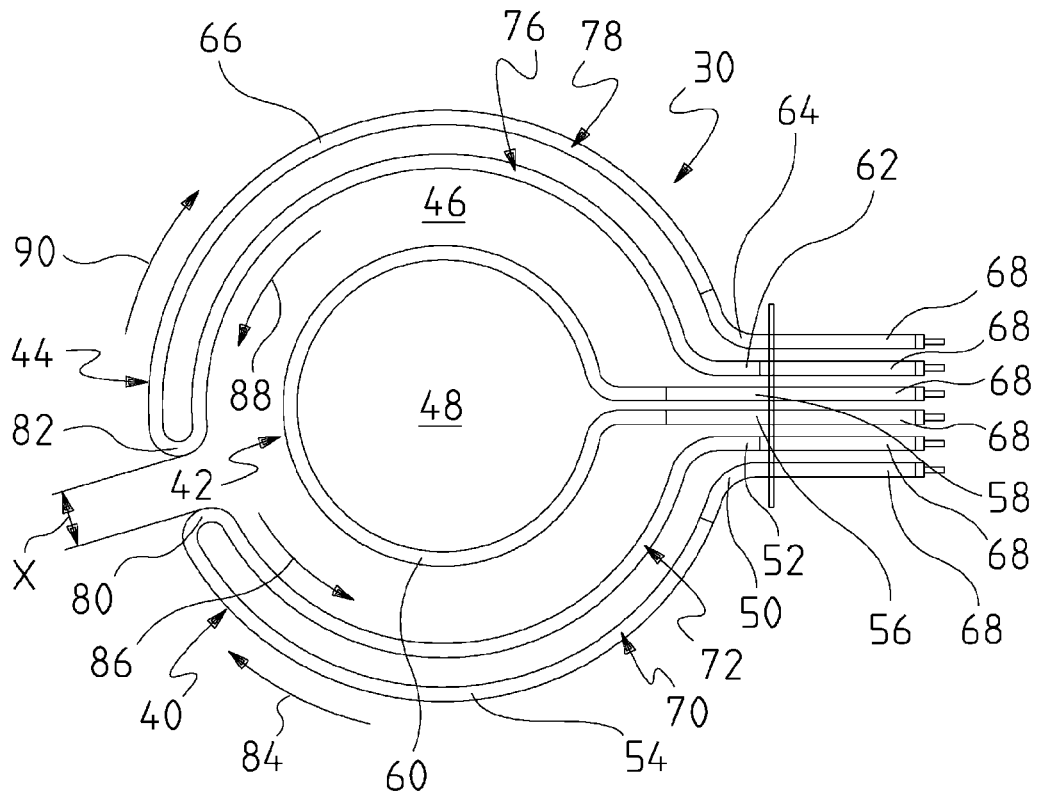
FIG. 2 is a schematic top view of an embodiment of an upper heating element assembly of the appliance of FIG. 1.
Figure 3:
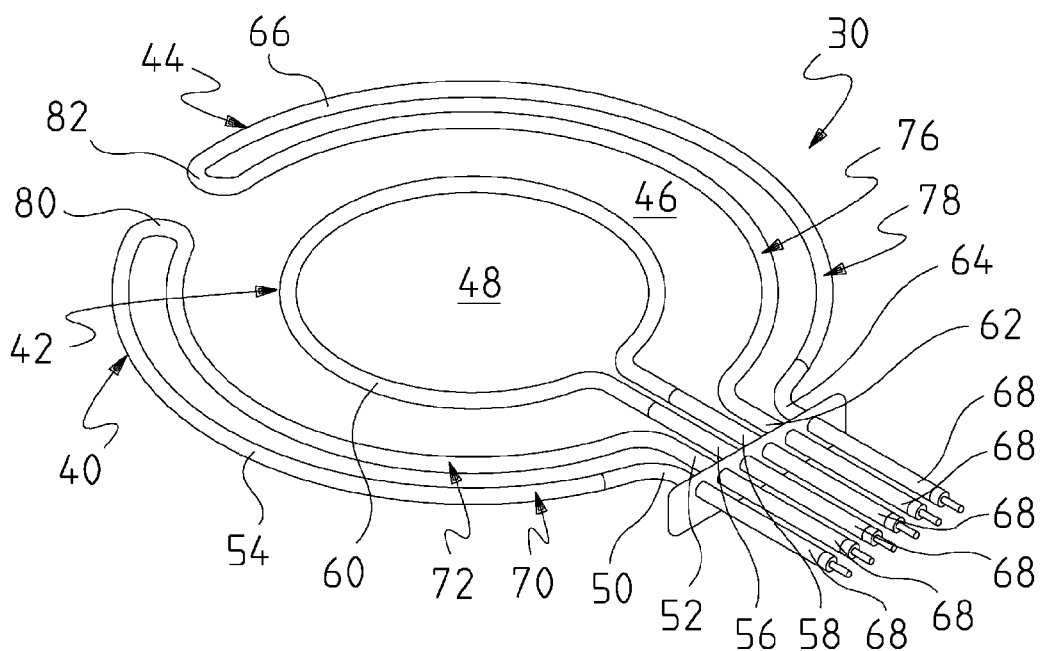
FIG. 3 is a schematic isometric view of the upper heating element assembly of FIG. 2.

In FIGS. 2 and 3, there is schematically depicted an embodiment of the upper heating assembly 30 of the appliance 10. The upper heating assembly 30 includes a first heating element 40, a second heating element 42 and a third heating element 44. The first and third heating elements 40 and 44 at least partially surround an area 46 within which the second heating element 42 is located, such that the first and third heating elements 40 and 44 form an outer sub-assembly and the second heating element 42 forms an inner sub-assembly that is spaced apart from but located generally concentrically within the outer sub-assembly. The second heating element 42 surrounds an area 48. In the depicted embodiment, the area 48 is located centrally within the area 46.

The first heating element 40 includes first and second terminal end portions 50 and 52, and a length 54 extending between the end portions 50 and 52. The second heating element 42 includes terminal end portions 56 and 58, and a length 60 extending between the end portions 56 and 58. The third heating element 44 includes terminal end portions 62 and 64, and a length 66 extending between the end portions 62 and 64. Each of the first, second and third heating elements 40, 42 and 44 is provided with cold pins 68 at their respective end portions.

The length 54 of the first heating element 40 includes a first length portion 70 that extends from the respective end portion 50 and a second length portion 72 that extends from the respective end portion 52, with the second length portion 72 being adjacent the first length portion 70. The length 66 of the third heating element 44 likewise includes a first length portion 76 that extends from the respective end portion 62 and a second length portion 78 that extends from the respective end portion 64, with the second length portion 78 being adjacent the first length portion 76.

In the depicted embodiment, the second length portion 72 of the length 54 is spaced apart from the second heating element 42, and the first length portion 76 of the length 66 is likewise spaced apart from the second heating element 42.

The length 54 of the first heating element 40 further includes an end portion 80 and the length of the third heating element 44 likewise further includes an end portion 82. In the depicted embodiment, the end portions 80 and 82 have an arcuate shape. It would, however, be understood that the end portions 80 and 82 may have any other shape suitable for a heating element. The end portion 80 is located between so as to connect the first and second length portions 70 and 72 of the length 54. The end portion 82 is likewise located between so as to connect the first and second length portions 76 and 78 of the length 66.

In the depicted embodiment, the first length portion 70 extends generally along a first arcuate path 84 from the terminal end portion 50 of the first heating element 40 towards the arcuate end portion 80. The second length portion 72 extends generally along a second arcuate path 86 from the arcuate end portion 80 towards the terminal end portion 52 of the first heating element 40. The first and second arcuate paths 84 and 86 are each curved so as to follow the curvature of the second heating element 42, with the first arcuate path 84 being generally parallel to the second arcuate path 86.

Likewise, the first length portion 76 extends generally along a first arcuate path 88 from the terminal end portion 62 of the third heating element 44 towards the arcuate end portion 82. The second length portion 78 extends generally along a second arcuate path 90 from the arcuate end portion 82 towards the terminal end portion 64 of the third heating element 44. The first and second arcuate paths 88 and 90 are each curved so as to follow the curvature of the second heating element 42, with the first arcuate path 88 being generally parallel to the second arcuate path 90.

In the depicted embodiment, the length 66 of the third heating element 44 is greater than the length 54 of the first heating element 40. The length 66 may be in the range of between 700 to 700 mm, and preferably between 740 to 750 mm. The length 54 of the first heating element 40 may be in the range of between 600 to 700 mm, and preferably between 630 to 640 mm. It will be appreciated that in other embodiments (not shown), the length 54 of the first heating element 40 may be the same or less than the length 66 of the third heating element 44. The length 60 of the second heating element 42 may be in the range of between 500 to 600 mm, and preferably between 530 to 540 mm.

The arcuate end portion 80 of the first heating element 40 is opposite to the arcuate end portion 82 of the third heating element 44. The arcuate end portion 80 is also spaced from the arcuate end portion 82 by a gap X. The gap X may be in the range of between 20 to 30 mm.

Figure 4:
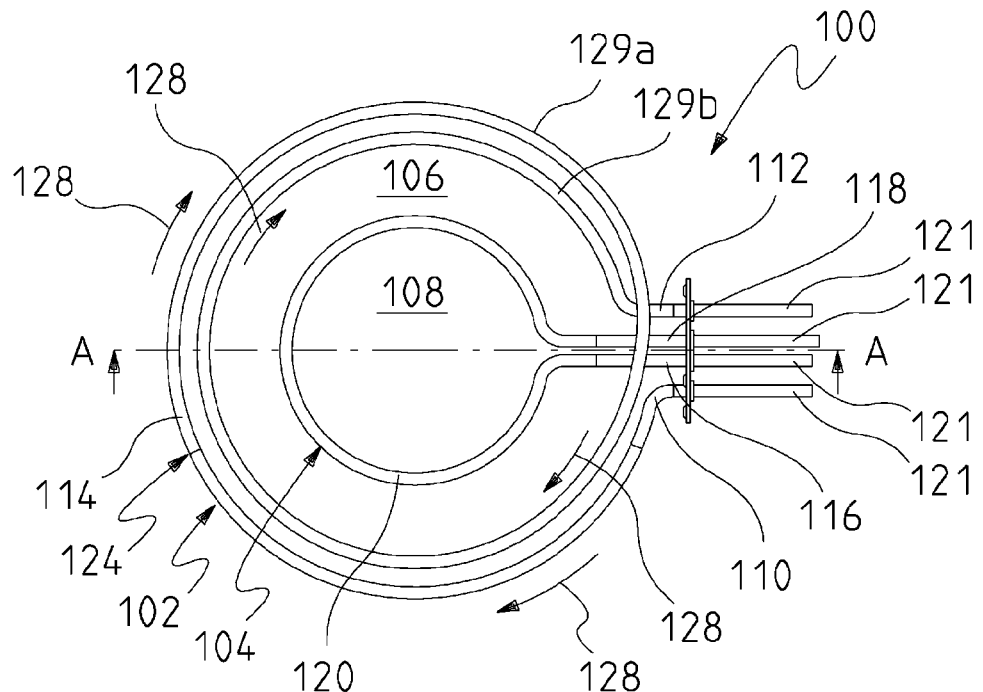
FIG. 4 is a schematic top view of another embodiment of an upper heating element assembly of the appliance of FIG. 1.
Figure 5:
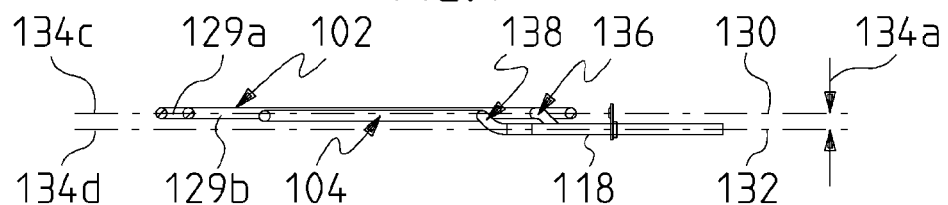
FIG. 5 is a schematic sectioned side view of the upper heating element assembly of FIG. 4.
Figure 6:
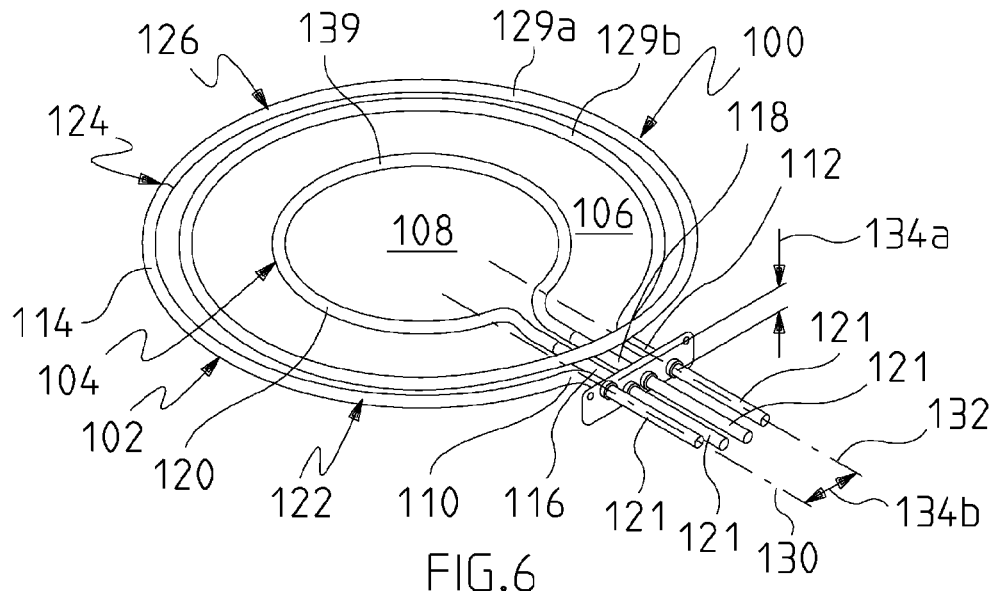
FIG. 6 is a schematic isometric view of the upper heating element assembly of FIG. 4.

In FIGS. 4 to 6, there is schematically depicted another embodiment of an upper heating assembly 100 of the appliance 10. In this embodiment, the upper heating assembly 100 includes a first heating element 102 and a second heating element 104. The first heating element 102 at least partially surrounds an area 106 within which the second heating element 104 is located, such that the first heating element 102 forms an outer sub-assembly and the second heating element 104 forms an inner sub-assembly. The second heating element 104 surrounds an area 108. In the depicted embodiment, the area 108 is located centrally within the area 106.

The first heating element 102 includes first and second terminal end portions 110 and 112, and a length 114 extending between the end portions 110 and 112. The second heating element 104 includes terminal end portions 116 and 118, and a length 120 extending between the end portions 116 and 118. Each of the first and second heating elements 102 and 104 is provided with a cold pin 121 at their respective end portions.

The length 114 of the first heating element 102 includes a first length portion 122 that extends from the end portion 110 towards an intersection 124. The length 114 also includes a second length portion 126 that extends from the intersection 124 towards the end portion 112. It will be understood that the intersection 124 is a location at which the first and second length portions 122 and 126 meet, whereby the first length portion 122 may have a first wattage density and the second length portion 126 may have a second wattage density that is different than the first wattage density. The first length portion 122 may have a length in the range of between 300 to 400 mm, and preferably in the range of between 340 to 350 mm. The second length portion 126 may have a length in the range of between 1000 to 1300 mm, and preferably in the range of between 1200 to 1250 mm. It will also be appreciated that the length 114 of the first heating element 102 may have a wattage density that is different to a wattage density of the length 120 of the second heating element 104.

The end portion 110 includes a first axis 130 and the end portion 112 includes a second axis 132 that is offset (i.e. spaced apart) from the first axis 130 by a vertical distance 134a and a horizontal distance 134b. In the depicted embodiment, the first axis 130 is located vertically above the second axis 132. In other embodiments (not shown, the first axis 130 may be located vertically below the second axis 132. The first axis 130 defines a first plane 134c and the second axis 132 defines a second plane 134d (see FIG. 5), with the first and second planes 134c and 134d also being offset (i.e. spaced apart) by the vertical distance 134a. In the depicted embodiment, the first plane 134c is located above the second plane 134d. However, in other embodiments (not shown), the first plane 134c may be located below the second plane 134d.

In the depicted embodiment, the length 114 extends from the end portion 110 generally along a coiled or looped path 128 towards the end portion 112, forming a first loop 129a and a second loop 129b that is spaced apart from the first loop 129a. The first and second loops 129a and 129b surround the area 106. The first loop 129a may have a diameter in the range of between 200 to 300 mm, and preferably in the range of between 260 to 270 mm. The second loop 129b may have a diameter in the range of between 200 to 300 mm, and preferably in the range of between 230 to 240 mm. In other embodiments (not shown), the length 114 may form more than two loops having a similar configuration as the first and second loops 129a and 129b.

The first loop 129a is extends along a circular path having a full revolution that begins at the end portion 110 and is located on the first plane 134c defined by the first axis 130. The second loop 129b also extends along a circular path having a full revolution that begins generally around the end of the first loop 129a to the end portion 112. The second loop 129b is also located on the first plane 134c defined by the first axis 130. That is, the first and second loops 129a and 129b are co-planar.

As best shown in FIG. 5, the second loop 129b of the first heating element 102 includes a stepped portion 136 that extends the vertical distance 134a between the first and second planes 134c and 134d. The stepped portion 136 provides the connection between the second loop 129b (located on the first plane 134c) and the second terminal end portion 112 of the first heating element 102 (located on the second plane 134d). The stepped portion 136 may have a length in the range of between 10 to 30 mm. It will be understood that in the depicted employment, the first and second loops 129a and 129b are co-planar with the first terminal end portion 110 (i.e. located on the first plane 134c), whilst the second terminal end portion 112 is located on the second plane 134d below the first plane 134c.

The length 120 of the second heating element 104 forms a loop 139 that is located on the first plane 134c within the area 106. As best shown in FIG. 5, the loop 139 also includes a stepped portion 138 that also extends the vertical distance 134a between the first and second planes 134c and 134d. The stepped portion 138 provides the connection between the loop 139 (located on the first plane 134c) and the terminal end portions 116 and 118 of the second heating element 104 (located on the second plane 134d). The stepped portion 138 may have a length in the range of between 10 to 30 mm. It will be understood that in the depicted embodiment, the loop 129 of the second heating element 104 is co-planar with the first and second loops 129a and 129b of the first heating element 102 (i.e. located on the first plane 134c). The end portions 116 and 118 of the second heating element 104 are co-planar with the second end portion 112 of the first heating element 102 (i.e. located on the second plane 134d below the first plane 134c).

In the depicted embodiment, the length 114 of the first heating element 102 is spaced apart from the length 120 of the second heating element 104.

Figure 7:
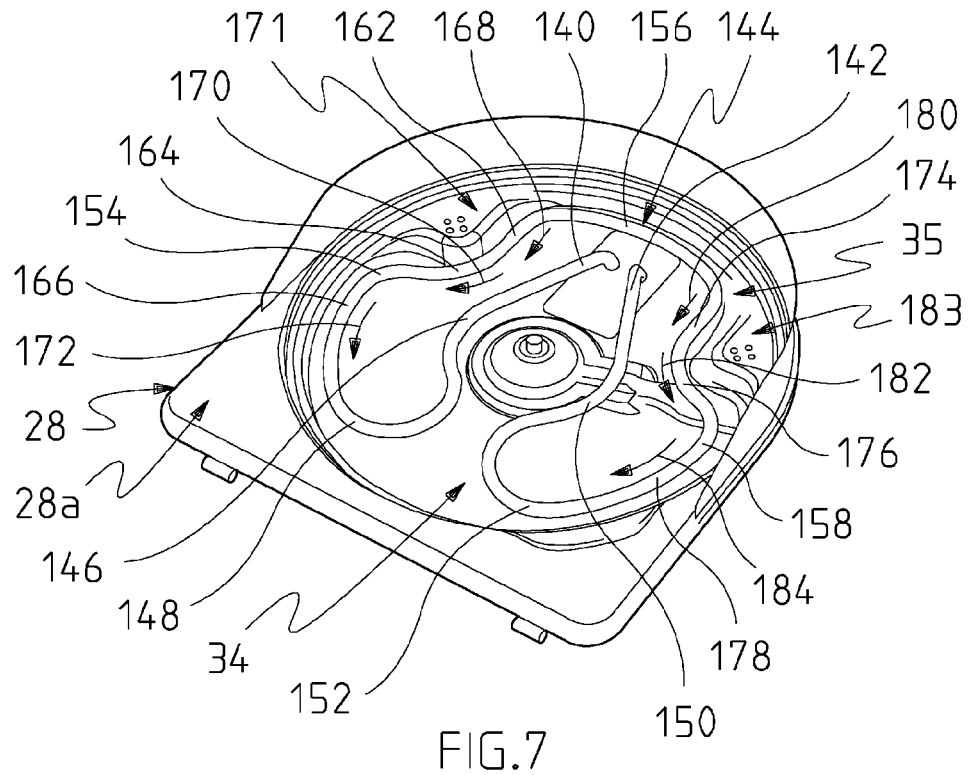
FIG. 7 is a schematic isometric view of a lower heating element assembly mounted to a deck of the appliance of FIG. 1.

In FIG. 7, there is schematically depicted an embodiment of the lower heating assembly 34 of the appliance 10 supported by the deck 28. In the depicted embodiment, the lower heating assembly 34 is supported on an underside 28a of the deck 28. The lower heating assembly 34 includes a heating element 35 having a first terminal end portion 140, a second terminal end portion 142 and a length 144 extending between the first and second terminal end portions 140 and 142. The length 144 may be in the range of between 1000 to 1200 mm, and preferably in the range of between 1150 to 1160 mm. In the depicted embodiment, the first and second terminal end portions 140 and 142 and mounted on and extend away from the underside 28a of the deck 28 so as to support the heating element 35 thereon.

The length 144 includes a first length portion 146 that extends from the first terminal end portion 140 towards a first arcuate end portion 148. The length 144 further includes a second length portion 150 that extends from the second terminal end portion 142 towards a second arcuate end portion 152. The first and second length portions 146 and 150 may each have a length in the range of between 200 to 300 mm, and preferably in the range of between 230 to 240 mm.

The length 144 further includes a third length portion 154 that extends from the first arcuate end portion 148 towards a bridge portion 156. The length 144 further includes a fourth length portion 158 that extends from the second arcuate end portion 152 towards the bridge portion 156. The bridge portion 156 therefore connects the third and fourth length portions 154 and 158. The third and fourth length portions 154 and 158 may each have a length in the range of between 300 to 400 mm, and preferably in the range of between 330 to 340 mm.

In the depicted embodiment, the first and second length portions 146 and 150 are located between the third and fourth length portions 154 and 158. It will therefore be understood that the first and second length portions 146 and 160 form an inner section of the heating element 35 and the third and fourth length portions 154 and 158 form an outer section of the heating element 35.

The third length portion 154 further includes a first sub-portion 162, a second sub-portion 164 and a third sub-portion 166. In the depicted embodiment, the first sub-portion 162 extends between the bridge portion 156 and the second sub-portion 164. The second sub-portion 164 in turn connects the first sub-portion 162 to the third sub-portion 166. The third sub-portion 166 extends from the second sub-portion 164 to the first arcuate end portion 148. The first sub-portion 162 may have a length in the range of between 100 to 110 mm, the second sub-portion 164 may have a length in the range of between 55 to 65 mm, and the third sub-portion 166 may have a length in the range of between 150 to 170 mm.

In the depicted embodiment, the first sub-portion 162 includes a major direction of extension 168. The second sub-portion 164 diverges from the first sub-portion 162 towards the third sub-portion 166 along a direction 170. The second sub-portion 164 diverges from the first sub-portion 162 so as to avoid a feature 171 that protrudes from the underside 28a of the deck 28. The third sub-portion 166 converges from the second sub-portion 154 towards the first arcuate end portion 148 along a direction 172.

In a configuration that substantially mirrors the configuration of the third length portion 154, the fourth length portion 158 also includes a first sub-portion 174, a second sub-portion 176 and third sub-portion 178. The first sub-portion 174 extends between the bridge portion 156 and the second sub-portion 176. The second sub-portion 176 in turn connects the first sub-portion 174 to the third sub-portion 178. The third sub-portion 178 extends from the second sub-portion 176 towards the second arcuate end portion 152. The first sub-portion 174 may have a length in the range of between 100 to 110 mm, the second sub-portion 176 may have a length in the range of between 55 to 65 mm, and the third sub-portion 178 may have a length in the range of between 155 to 165 mm.

In the depicted embodiment, the first sub-portion 174 includes a major direction of extension 180 that is generally parallel to the major direction of extension 168 of the first sub-portion 162. The second sub-portion 176 diverges from the first sub-portion 174 towards the third sub-portion 178 along a direction 182. In the depicted embodiment, the direction 182 is generally opposite to the direction 170. The second sub-portion 176 diverges from the first sub-portion 174 so as to avoid a feature 183 that protrudes from the underside 28a of the deck 28. The third sub-portion 178 converges from the second sub-portion 176 towards the second arcuate end portion 152 along a direction 184.

Figure 8:
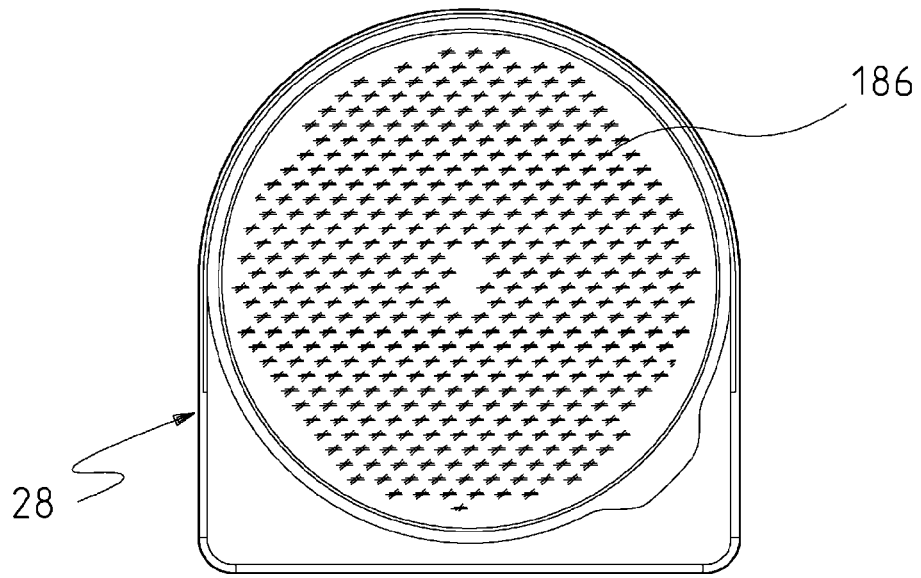
FIG. 8 is a schematic top view of a thermal distribution profile of the deck provided with the lower heating element assembly of FIG. 7.

FIG. 8 shows a thermal distribution profile of the deck 28 supporting the lower heating element assembly 34 described above. The warmest areas of the deck 28 are represented by hatching 186, and as such, it would be understood that the arrangement of the lower heating assembly 34 described above provides a fairly even thermal distribution around the deck 28. It will be appreciated from the appearance of the hatching 186 around the deck 28 is substantially circular to facilitate even heating of a substantially circular food item (e.g. pizza).

Figure 9:
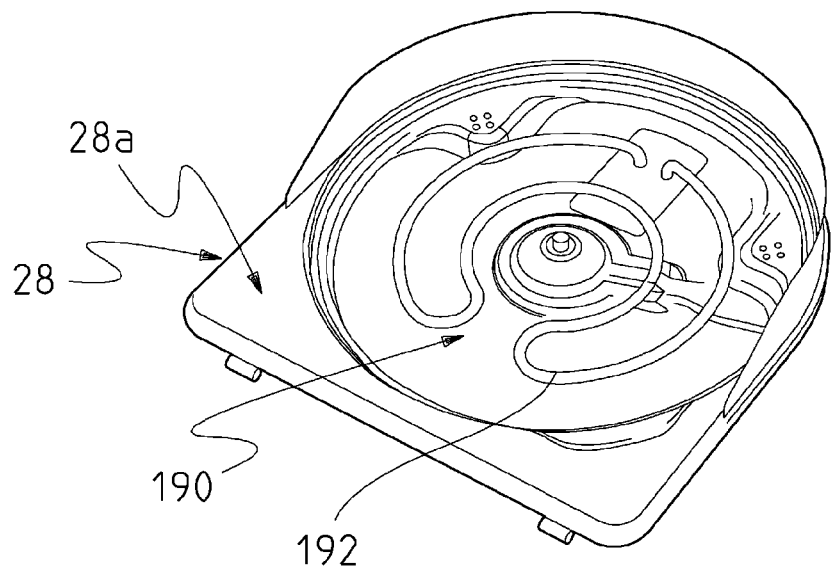
FIG. 9 is a schematic isometric view of a further lower heating element assembly mounted to a deck of the appliance of FIG. 1.
Figure 10:
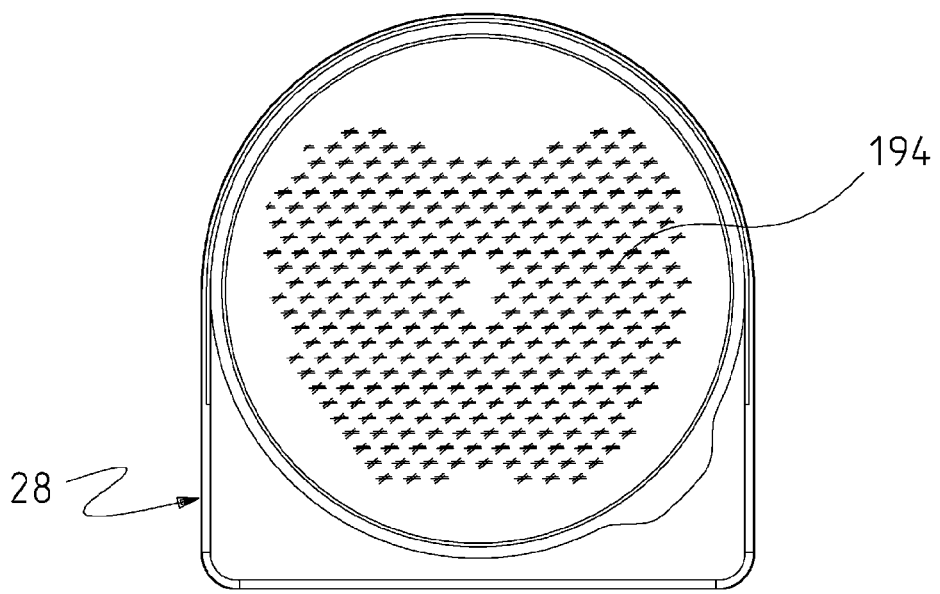
FIG. 10 is a schematic top view of a thermal distribution profile of the deck provided with the lower heating element assembly of FIG. 9.

FIG. 9 depicts another embodiment of a lower heating assembly 190 of the appliance 10 supported by the deck 28, with FIG. 10 depicted a corresponding thermal distribution profile of the deck 28 supporting the lower heating assembly 190. In this embodiment, the lower heating assembly 190 includes a heating element 192 that is smaller in size compared to the heating element 35 of the lower heating assembly 34. The heating element 192 extends around a substantially circular inner path and a substantially circular outer path with no diverging portions to avoid the features 171 and 182 that protrude from the underside 28a of the deck 28. As such, the transfer of heat from the heating element 192 to the deck 28 is inhibited by the features 171 and 183. This is clearly depicted in the thermal distribution profile of the deck 28 shown in FIG. 10, with the hatching 194 showing a relatively uneven thermal distribution around the deck 28, at least in comparison to the thermal distribution profile of the deck 28 provided by the lower heating element assembly 34.

Figure 11:
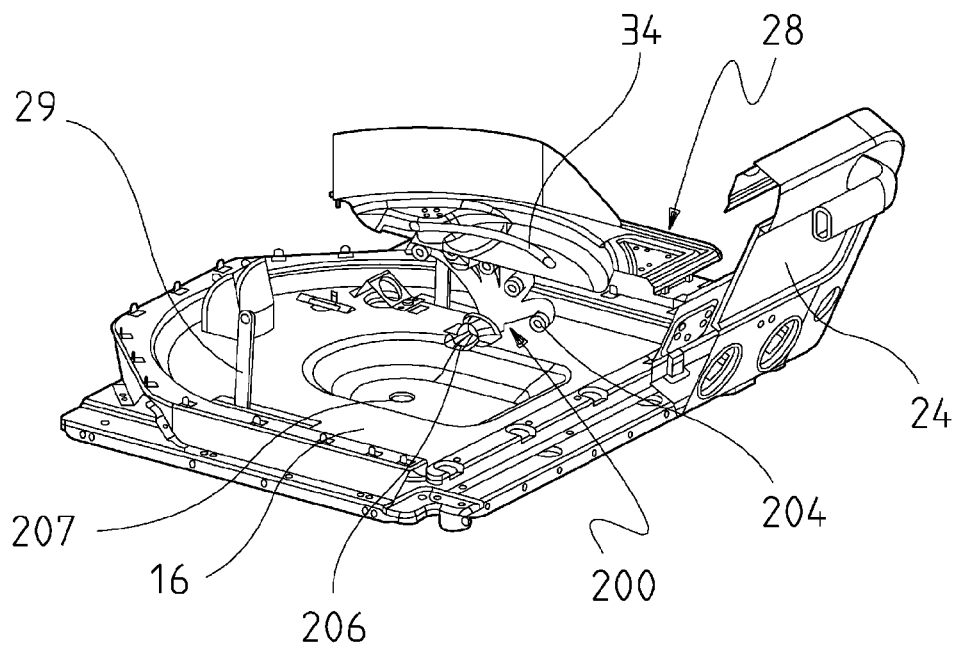
FIG. 11 is a schematic front view of the flexible electrical coupling of FIG. 10 in various positions.
Figure 12:
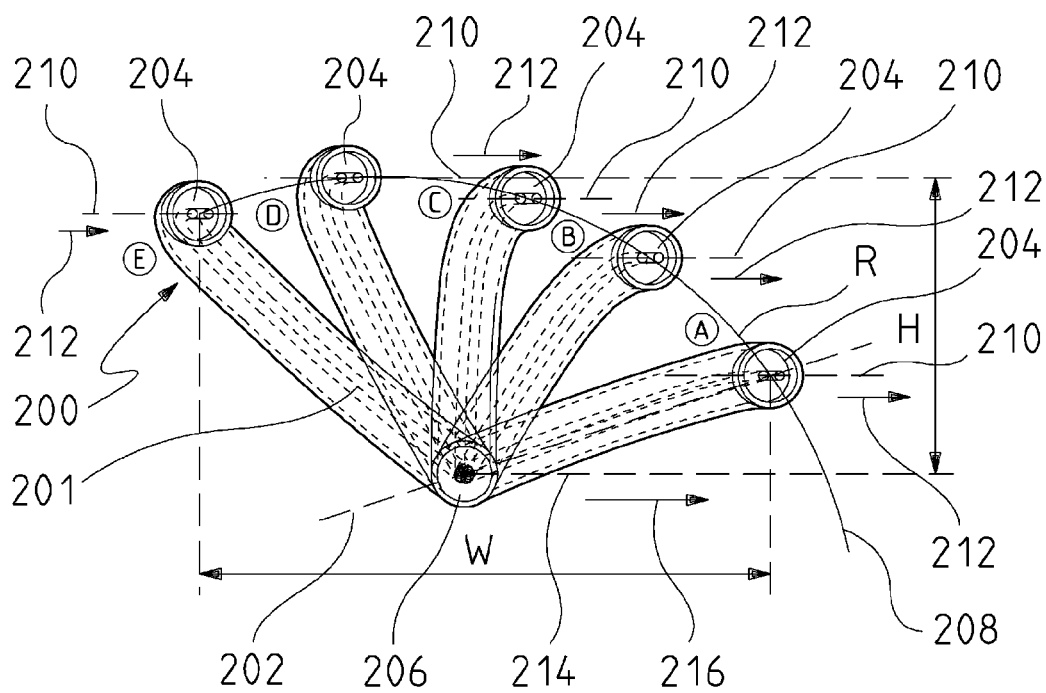

In FIGS. 11 to 20, there is schematically depicted an embodiment of a flexible electrical coupling 200 of the appliance 10. It will be understood that FIGS. 11 and 12 provide a schematic depiction of a singular flexible electrical coupling 200 in five different positions A, B, C, D and E.

The flexible electrical coupling 200 is in the form of a sheath that houses flexible wiring 201 which provides power to the lower heating element assembly 34. The flexible electrical coupling 200 is supported by the deck 28, which is movable relative to the floor 16 such that the flexible electrical coupling 200 also moves between the five positions A to E.

As best shown in FIG. 12, the flexible electrical coupling 200 is elongated so as to have a longitudinal axis 202. The flexible electrical coupling 200 also includes opposing first and second end portions 204 and 206. Returning to FIG. 11, the first end portion 204 is fixed to the deck 28 so as to remain stationary relative thereto, whilst the second end portion 206 is fixed to the floor 16 so as to remain stationary relative thereto. The flexible wiring 201 located within the flexible electrical coupling 200 is free to move within the flexible electrical coupling 200 and is only fixed below the floor 16 (e.g. via aperture 207 located in the floor 16).

The first end portion 204 is angularly movable relative to the second end portion 206 along an arcuate path 208, for example, between the positions A to E as shown in FIG. 12. In the depicted embodiment, the arcuate path 208 has a height H and a width W defining a curve having a radius of curvature R. The height H may be between 60 to 90 mm and the width between 110 to 170 mm to define a radius of curvature R of between 5 to 15 mm. The movement of the first end portion 204 relative to the second end portion 206 is caused by the movement of the deck 28 relative to the floor 16 (for instance, when a user opens the door 24 of the appliance, which causes the connected deck 28 to move with the door 24).

The first end portion 204 includes a first axis portion 210 of the longitudinal axis 202. The first axis portion 210 includes a major direction of extension 212. The second end portion 206 includes a second axis portion 214 of the longitudinal axis 202. The second axis portion 214 includes a major direction of extension 216. As illustrated in FIG. 12, for example, the major direction of extension 216 of the second axis portion 214 remains parallel to the major direction of extension 212 of the first axis portion 210 when the first end portion 204 is moved relative to the second end portion 206. It will be appreciated that this arrangement may at least allow the flexible wiring 201 within the flexible electrical coupling 200 to undergo minimal deformation from repeated movement of the first end portion 204 relative to the second end portion 206.

Figure 13:
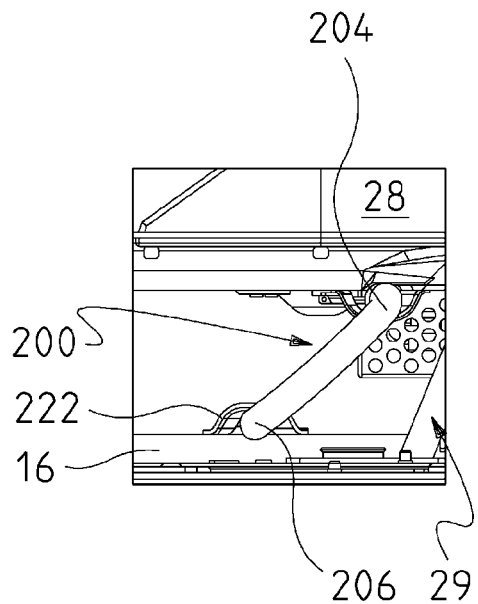
FIGS. 13 to 20 are schematic front views of the flexible electrical coupling of FIG. 10 in various positions.
Figure 14:
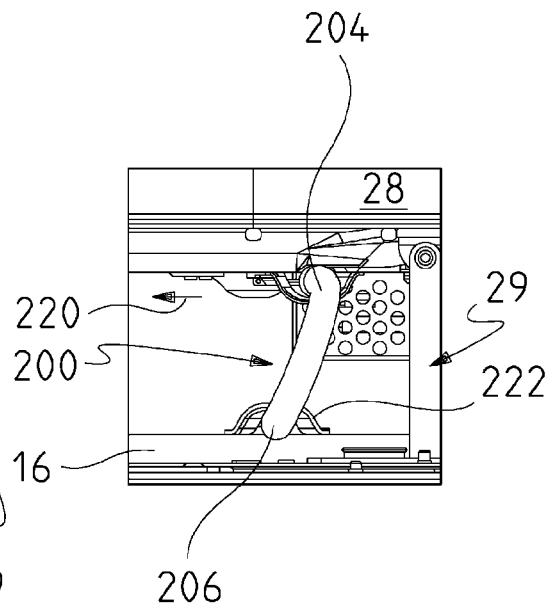
Figure 15:
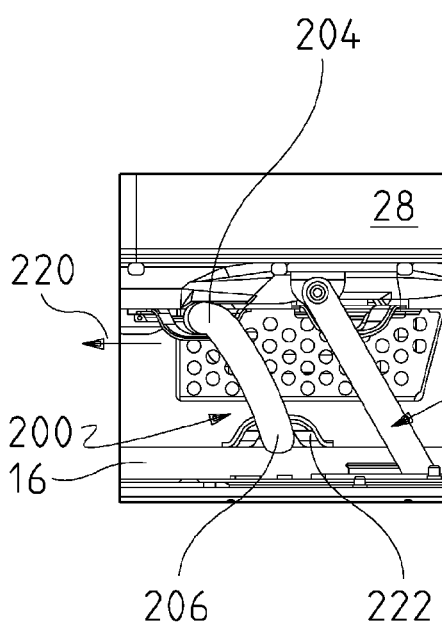
Figure 16:
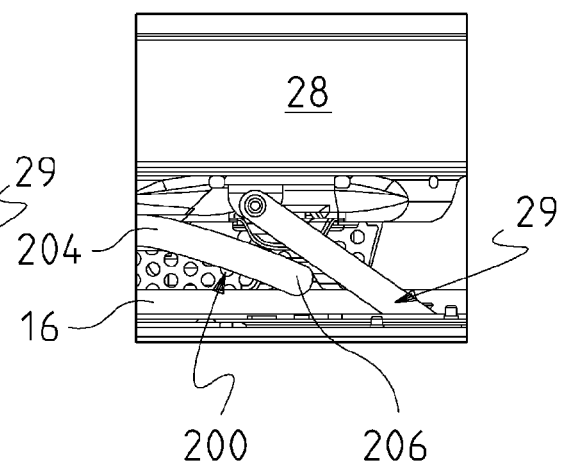
Figures 17, 18:
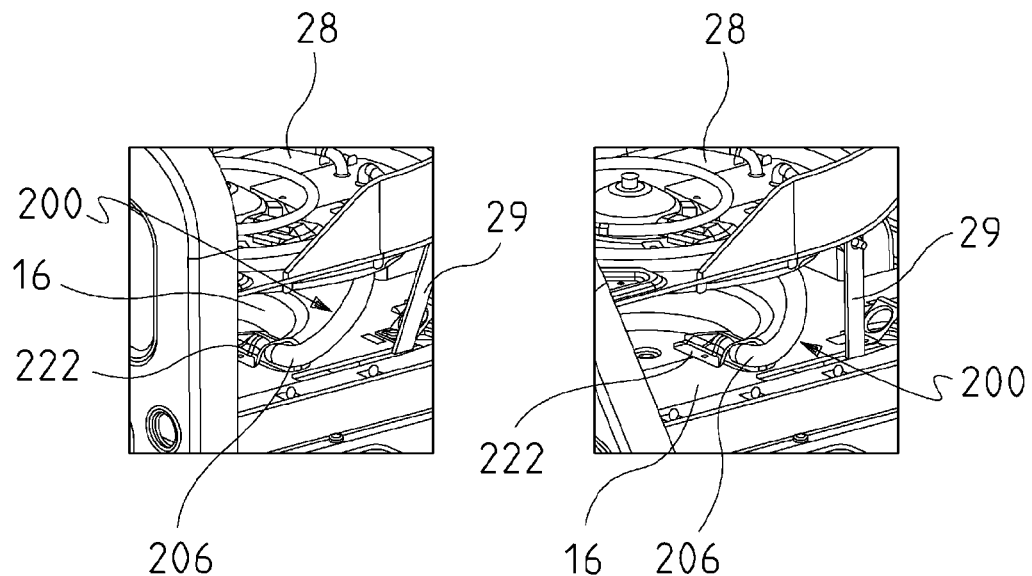
Figures 19, 20:
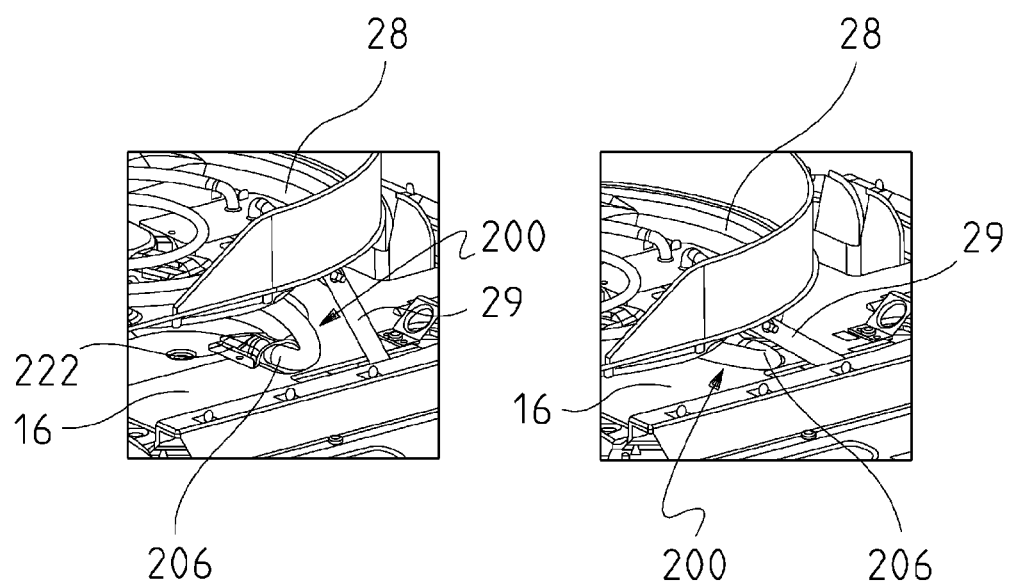

FIGS. 13 to 20 schematically depict the movement of the flexible electrical coupling 200 between the various different positions, in particular the movement of the first end portion 204 relative to the second end portion 206 as a result of a movement of the deck 28 along a direction 220 (see FIGS. 14 and 15) relative to the floor 16, which is caused by the movement of the door 24 of the appliance 10 between open and closed positions. FIGS. 13 to 20 also clearly depict the arm 29 that supports the deck 28 for movement relative to the floor 16 and a fastening member 222 to fix the second end portion 206 to the floor 16. FIGS. 13 and 17 show the position of the flexible electrical coupling 200 when the door 24 of the appliance 10 is in a closed position, FIGS. 14 and 18 when the door 24 of the appliance 10 is in a partially open position, FIGS. 15 and 19 when the door 24 of the appliance 10 is in a substantially open position, and FIGS. 16 and 20 when the door 24 of the appliance 10 is in a fully open position.

With reference to FIGS. 21 to 30, an embodiment of the deck 28 of the appliance 10 is described. It will be appreciated that the deck 28 may be formed from any material suitable for providing a cooking surface for the pizza, including (but not limited to) stone or ceramic. As discussed above, the lower heating element assembly 34 of the appliance 10 is supported at an underside 28a of the deck 28. In a preferred form, the lower heating element assembly 34 is adapted to abut the underside 28a of the deck 28 to transfer heat to the deck 28.

Figure 21:
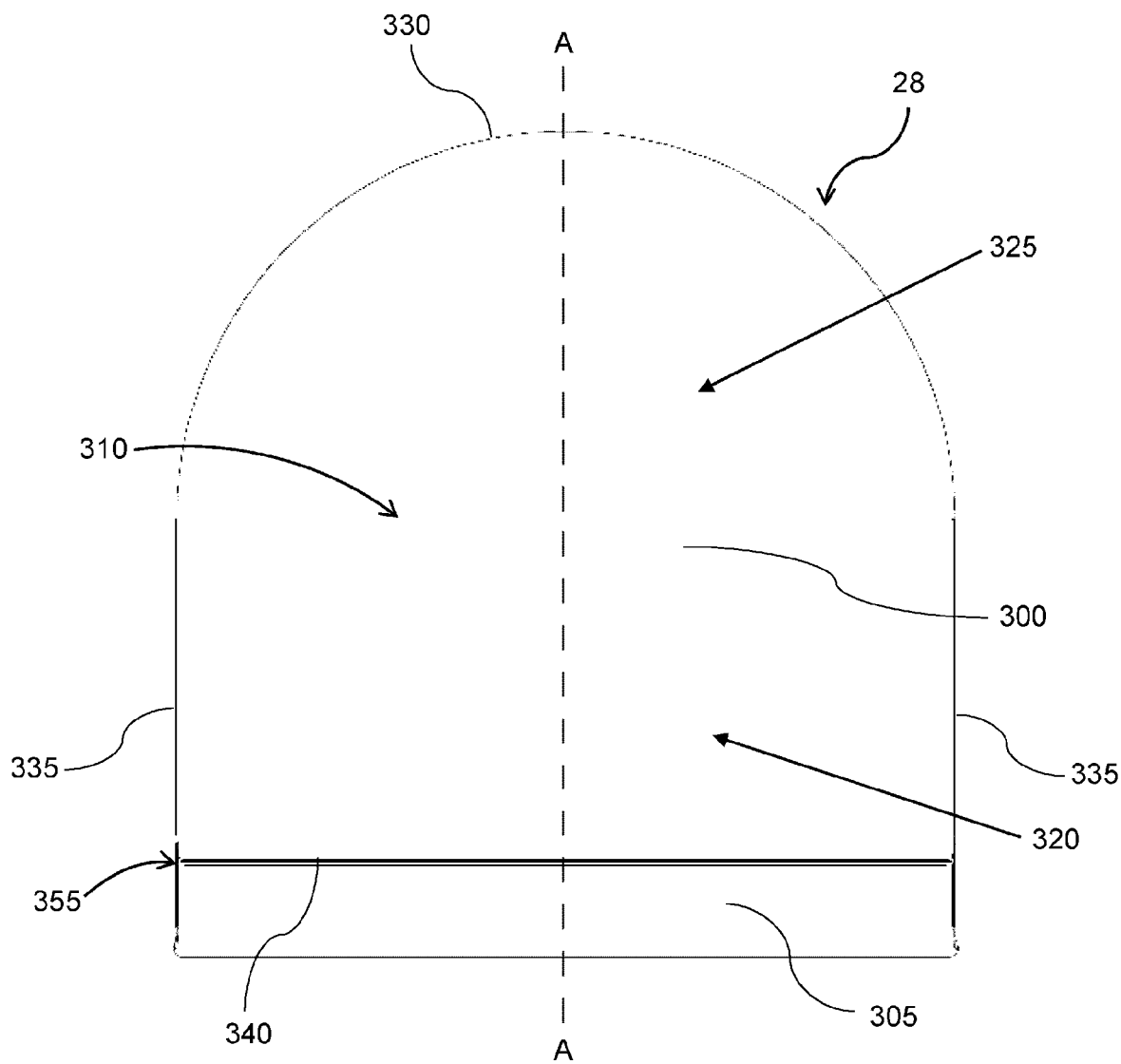
FIG. 21 is a schematic top view of an embodiment of a deck of the cooking appliance of FIG. 1.

Referring to FIGS. 21 to 24, the deck 28 includes a first portion 300 and a second portion 305. The first portion 300 includes a planar upper surface 310 and lower surface 315. The upper surface 310 of the first portion 300 provides the majority of the surface area upon which the pizza to be cooked is placed, and receives most of the heat from the upper and lower heating element assemblies 30 and 34. As best shown in FIG. 21, the first portion 300 also includes a forward segment 320 (to be located generally at the forward portion 27a of the cooking cavity 14) and a rear segment 325 (to be located generally at the rear portion 27b of the cooking cavity 14). The rear segment 325 has an arcuate edge 330. The forward segment 320 has side edges 335 and a periphery 340. The side edges 335 are parallel, and the periphery 340 is transverse of the parallel side edges 335.

Figure 22:
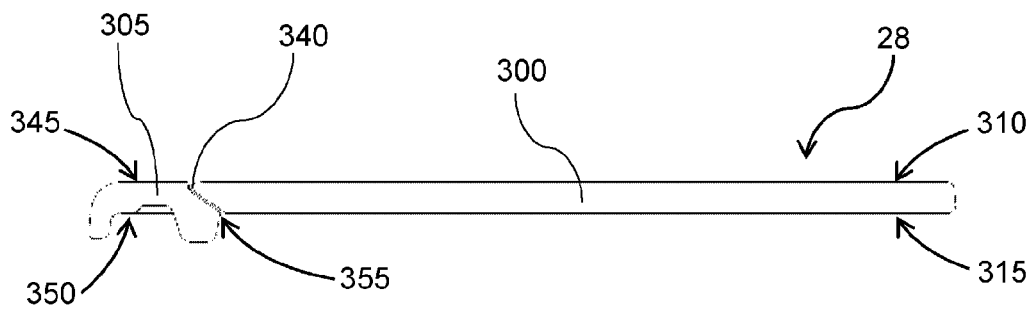
FIG. 22 is a schematic sectional side view of the deck of FIG. 21 along line A-A.
Figure 23:
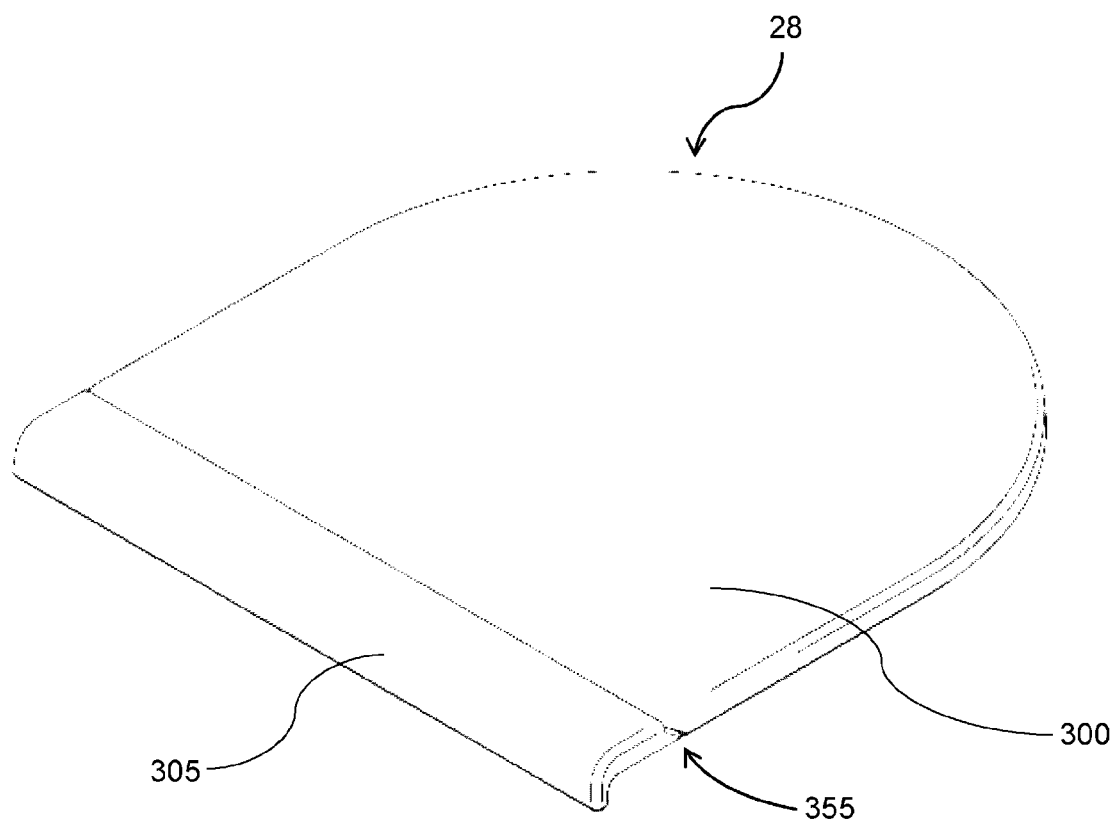
FIG. 23 is a schematic isometric view of the deck of FIG. 21.
Figure 24:
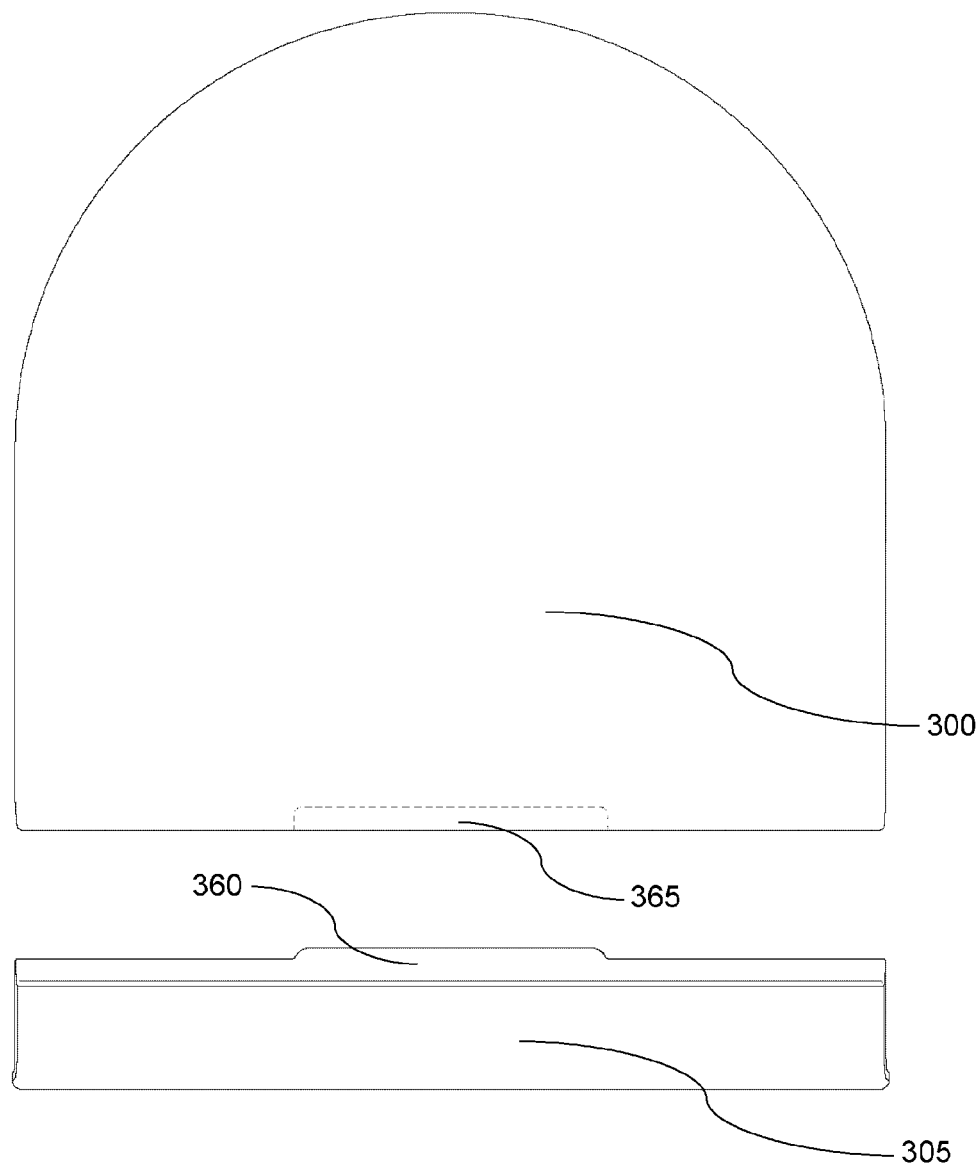
FIG. 24 is a schematic top view of the deck of FIG. 21, with the first portion separated from the second portion.
Figure 25:
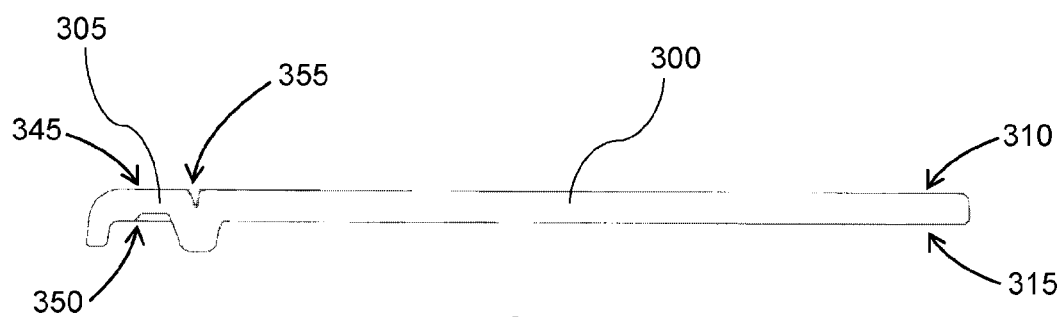
FIG. 25 is a schematic sectional side view of another embodiment of a deck of the cooking appliance of FIG. 1.

As best shown in FIG. 22, the second portion 305 includes a planar upper surface 345 and a lower surface 350. The upper surface 345 of the second portion 305 is co-planar with the upper surface 310 of the first portion 300. The second portion 305 is located adjacent to the periphery 340 of the first portion 300. In the embodiment as shown in FIGS. 21 to 24, the second portion 305 is separated from the first portion 300 by a slot 355 that extends along the periphery 340 from the planar upper surfaces 310, 345 to the lower surfaces 315, 350. Referring to FIG. 24, the second portion 305 includes a protrusion 360 adapted to engage a corresponding aperture 365 in the first portion 300, so as to secure the second portion 305 to the first portion 300. It is envisaged that in other embodiments, for example in the embodiment as shown in FIG. 25, the slot 355 may alternatively be in the form of a groove or notch extending partially between the upper surfaces 310, 345 and the lower surfaces 315, 350, such that the second portion 305 is partially separated from the first portion 300. In the depicted embodiments, the second portion 305 is located towards the opening 22 of the body 12, and generally at the forward portion 27a of the cooking cavity 14.

Figure 26:
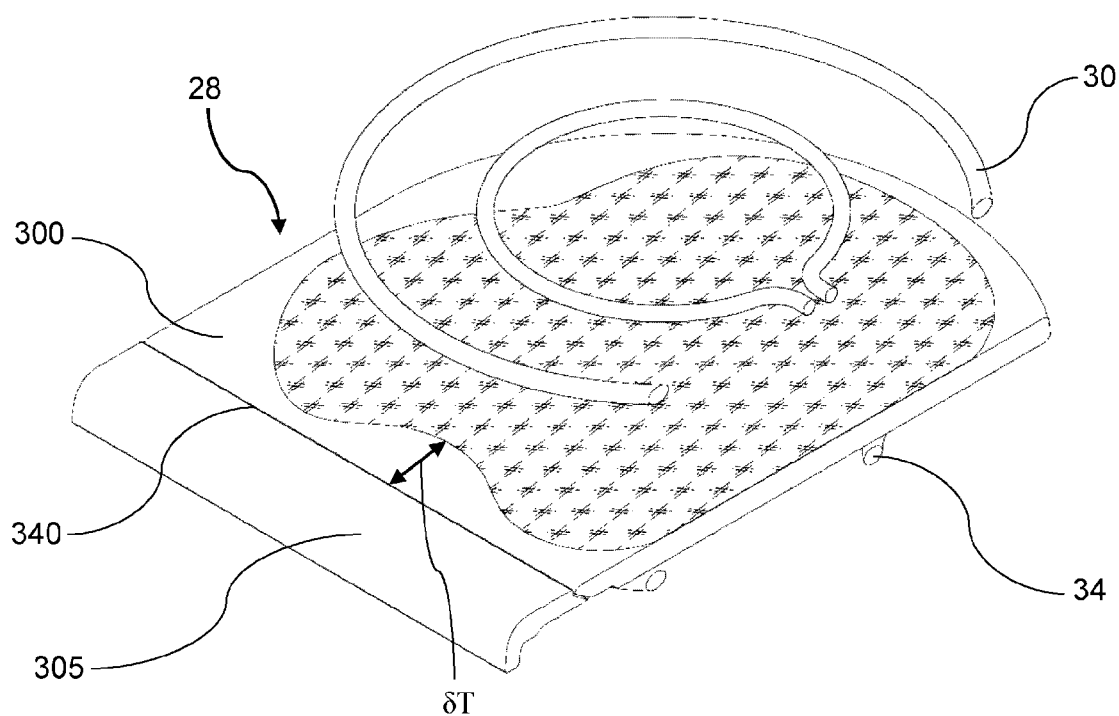
FIG. 26 is a schematic sectioned isometric view of the deck of FIG. 21 showing the temperature distribution thereof.
Figure 27:
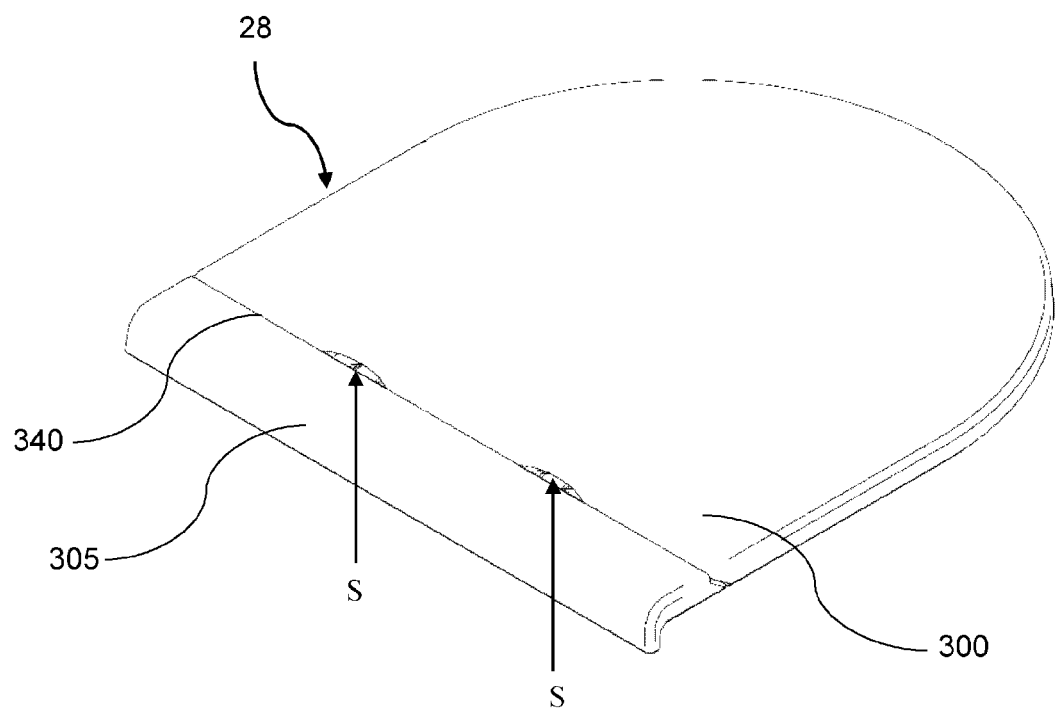
FIG. 27 is a schematic isometric view of the deck of FIG. 21 showing the stress distribution thereof.

The second portion 305 is separated from the first portion 300 to cause the heat from the upper and lower heating element assemblies 30, 34 to be distributed evenly around the first portion 300. The separation between the first and second portions 300 and 305 may at least eliminate a portion of a thermal distribution profile on the upper surface 310. Referring to FIG. 26, for example, by separating the second portion 305 from the first portion 300, the thermal distribution profile (the warmest areas being depicted in hatching) of the first portion 300 is also separated or split. In this way, the inherent properties of the material cause the thermal gradients and stress concentrations (as best shown in FIG. 27, the highest stress concentrations S also being depicted in hatching) around the first portion 300 to be reduced, thereby minimising or altogether eliminating cracking.

As will be understood by a skilled person, the following equation is used to calculate stress of a material:

$$\text{Stress} = F/A = E\alpha\delta T$$

where:
F is the force exerted on an object under tension;
A is the cross-sectional area;
E is the Young's modulus;
α is the temperature coefficient of thermal expansion; and
δT is the change in temperature.

It will be understood that the change in temperature (δT) may thus be manipulated to minimise stress. In particular, the change in temperature δT may be made smaller.

Figure 28:
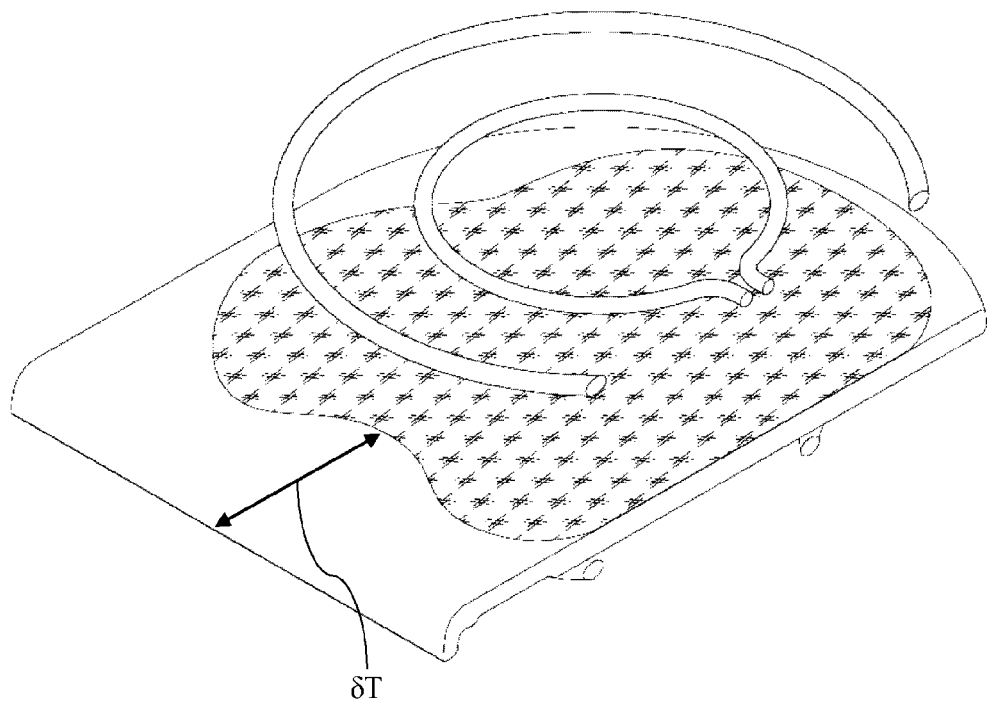
FIG. 28 is a schematic top view of an unsplit deck showing the temperature distribution thereof.
Figure 29:
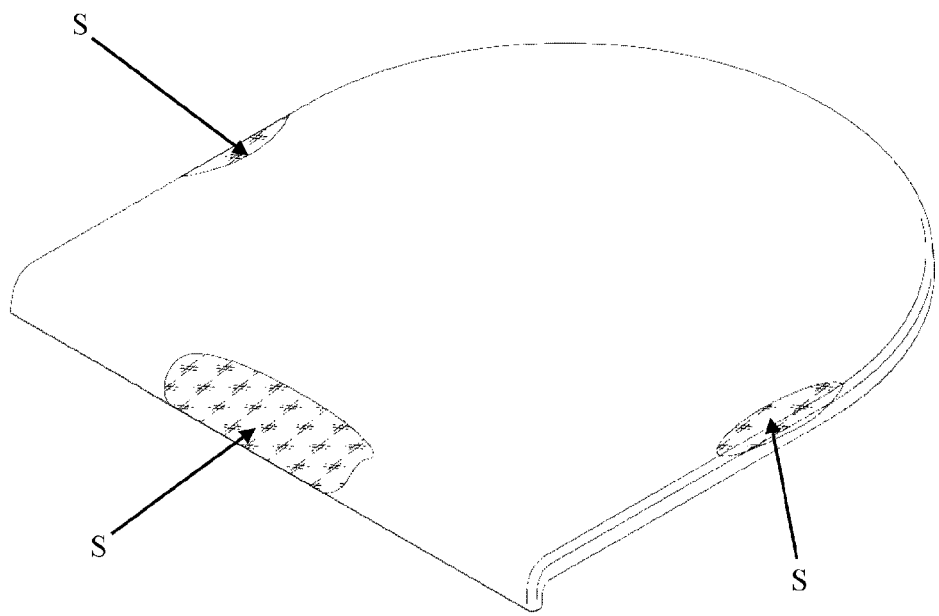
FIG. 29 is a schematic isometric view of an unsplit deck showing the stress distribution thereof.

By way of reference, FIG. 28 shows the temperature and stress distribution profiles of an unseparated/unsplit deck, whereby the change in temperature δT (defined by the distance between the warmest area of the deck to the coolest area of the deck near the periphery) is relatively large. The effect of this relatively large δT results in a number of stress concentrations S around the deck, as depicted in FIG. 29. Returning to FIG. 26, however, it is clear that the separation/splitting of the first and second portions 300 and 305 of the deck 28 results in a reduced/less varied change in temperature δT. This is because a portion of the thermal distribution profile that resides in the second portion 305 is removed, resulting in the change in temperature δT across the first portion 300 and the change in temperature δT across the second portion 305 being more or less homogenous. Whilst the first portion 300 is relatively hot, the change in temperature δT across the first portion 305 is reduced, which in turn leads to reduced stress concentrations around the deck 28 (as best shown in FIG. 27).

Figure 30:
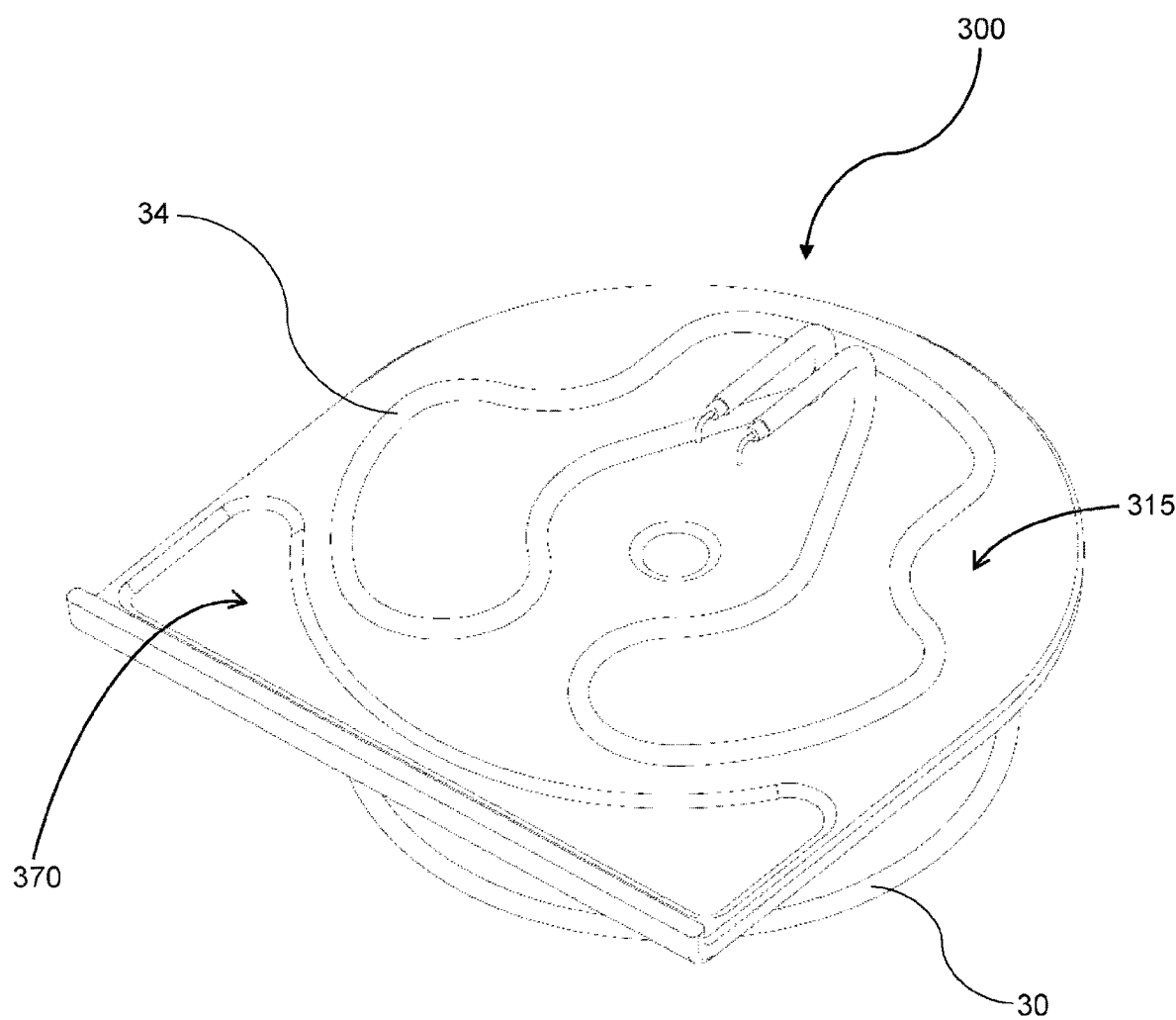
FIG. 30 is a schematic bottom isometric view of an embodiment of a first portion of the deck of FIG. 21.

FIG. 30 shows an embodiment of the first portion 300 including a recess 370 formed in the lower surface 315 of the first portion 300 (i.e. the side of the first portion 300 that faces the lower heating element assembly 34). It will be appreciated that the recess 370 acts as a locating detail to removably secure the deck 28 to a tray 375 of the cooking appliance 10.

Figure 30A:
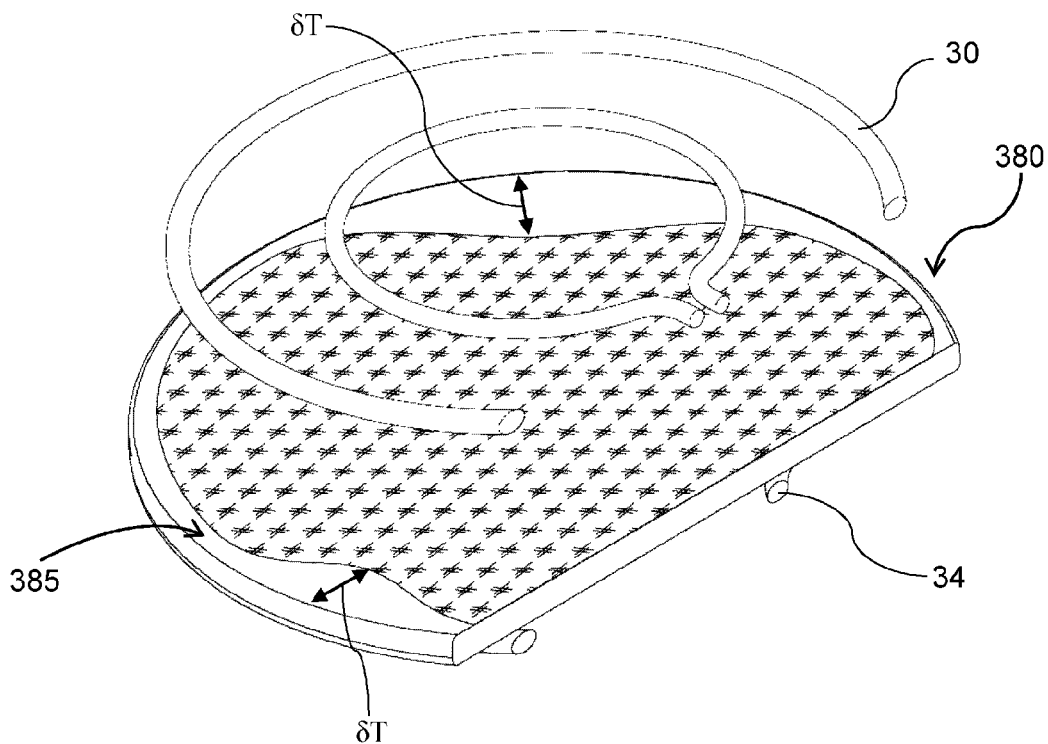
FIG. 30A is a schematic top view of a further embodiment of a deck showing the temperature distribution thereof.
Figure 30B:
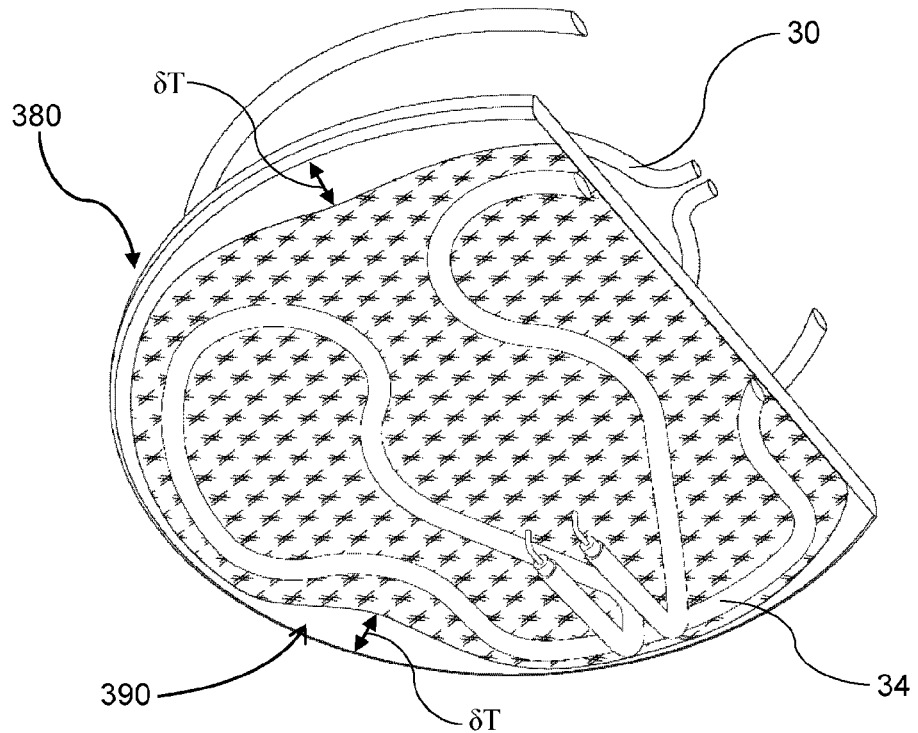

FIGS. 30A and 30B show an embodiment of a deck 380 that has a different configuration to the embodiment of the deck 28 described above. In this embodiment, the pizza deck 380 has a substantially circular configuration having a planar upper surface 385 which receives most of the heat from the upper heating element assembly 30, and a planar lower surface 390 which receives most of the heat from the lower heating element assembly 34. It will be appreciated that this substantially circular configuration of the deck 280 is more closely aligned with the substantially circular configuration of the upper and lower heating element assemblies 30, 34 (and in particular, the upper heating element assembly 30 as depicted in the Figures). This is particularly advantageous for creating an even distribution of heat across the deck 380. In FIGS. 30A and 30B, the temperature distribution profile (the warmest areas being depicted in hatching) of the deck 380 illustrates the change in temperature δT (defined by the distance between the warmest area of the deck 380 to the coolest area of the deck 380 near the periphery) is more or less homogenous (i.e. evenly distributed) across the deck 380.

Figure 31:
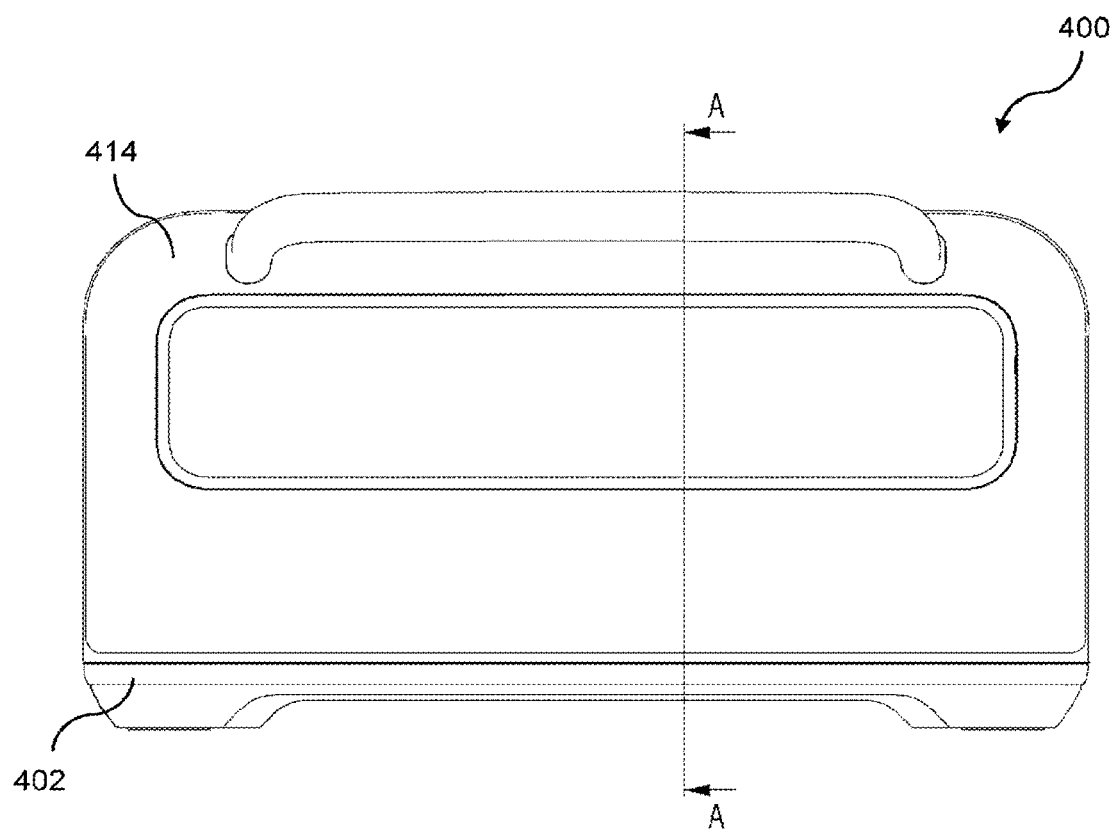
FIG. 31 is front view of a cooking appliance according to an embodiment.
Figure 32:
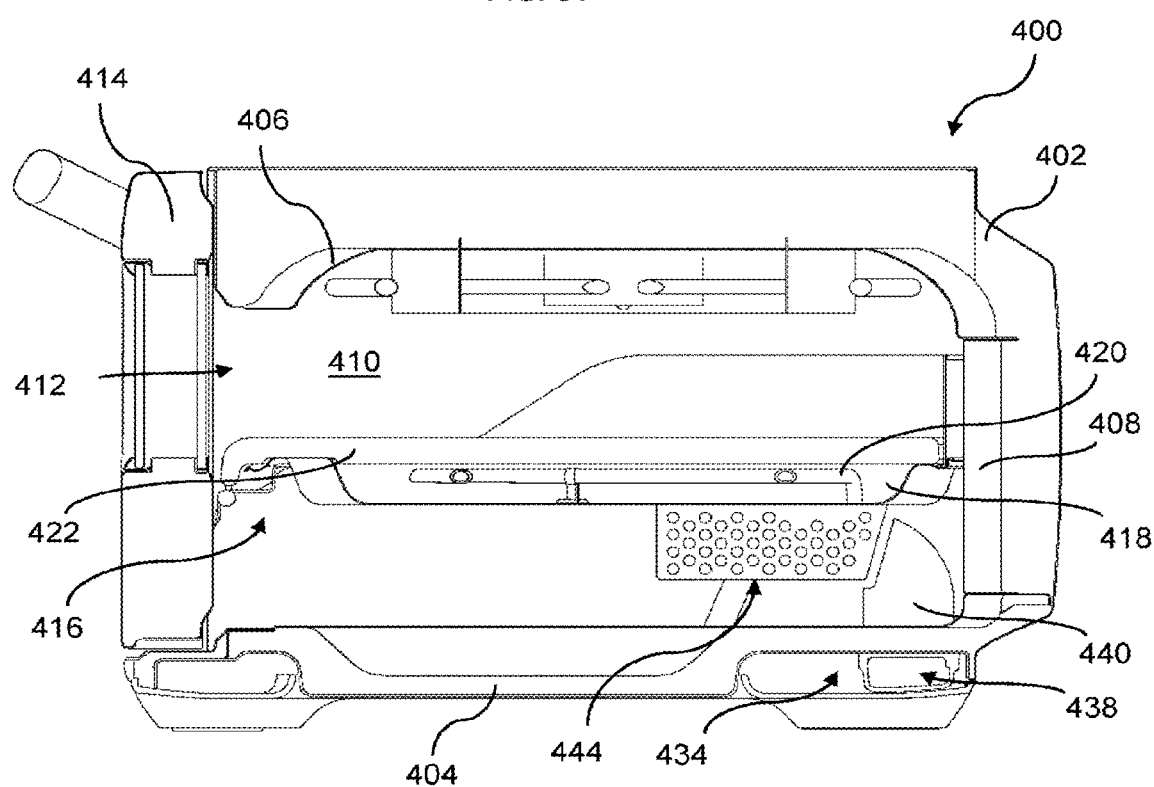
FIG. 32 is a sectioned side view of the cooking appliance of FIG. 31 sectioned along the line A-A.
Figure 33:
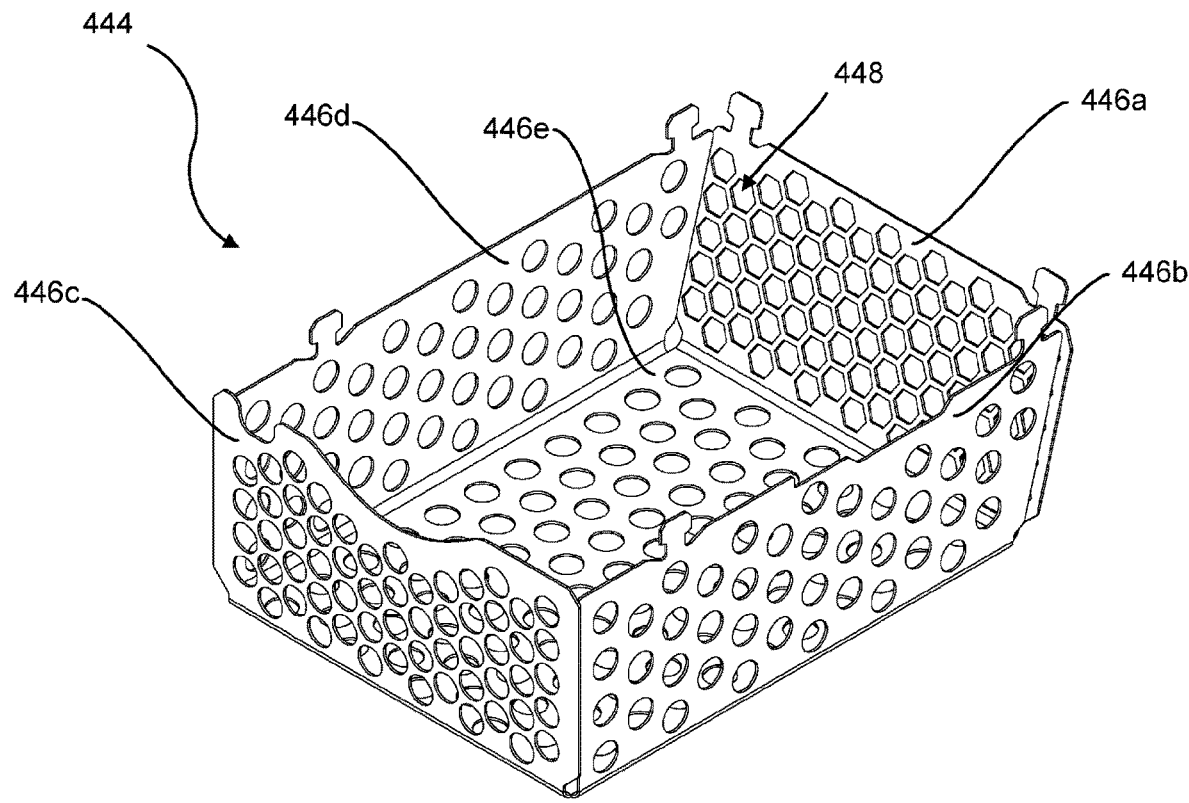
FIG. 33 is an isometric view of a shield of the appliance of FIG. 31.
Figure 34:
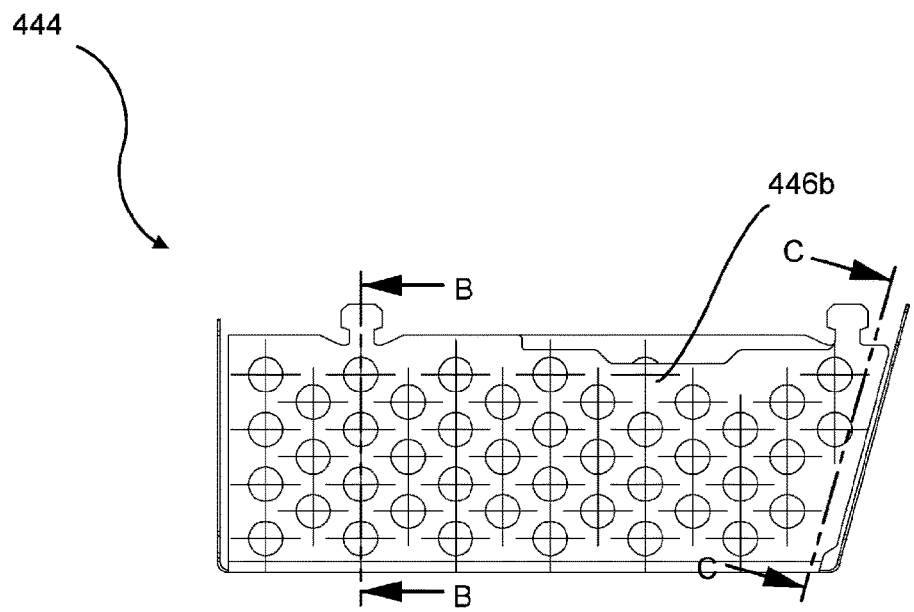
FIG. 34 is a side view of the shield of FIG. 33.
Figure 35:
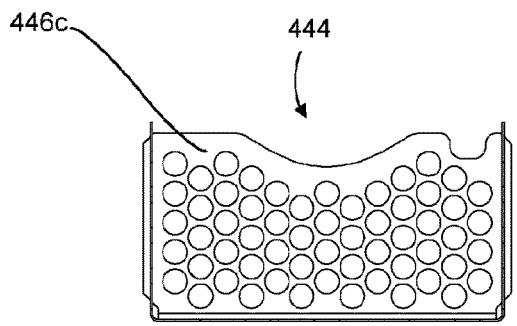
FIG. 35 is a sectioned view of the shield of FIG. 34 sectioned along the line B-B.
Figure 36:
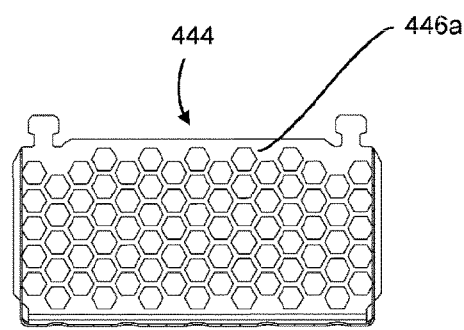
FIG. 36 is a sectioned view of the shield of FIG. 34 sectioned along the line C-C.
Figure 37:
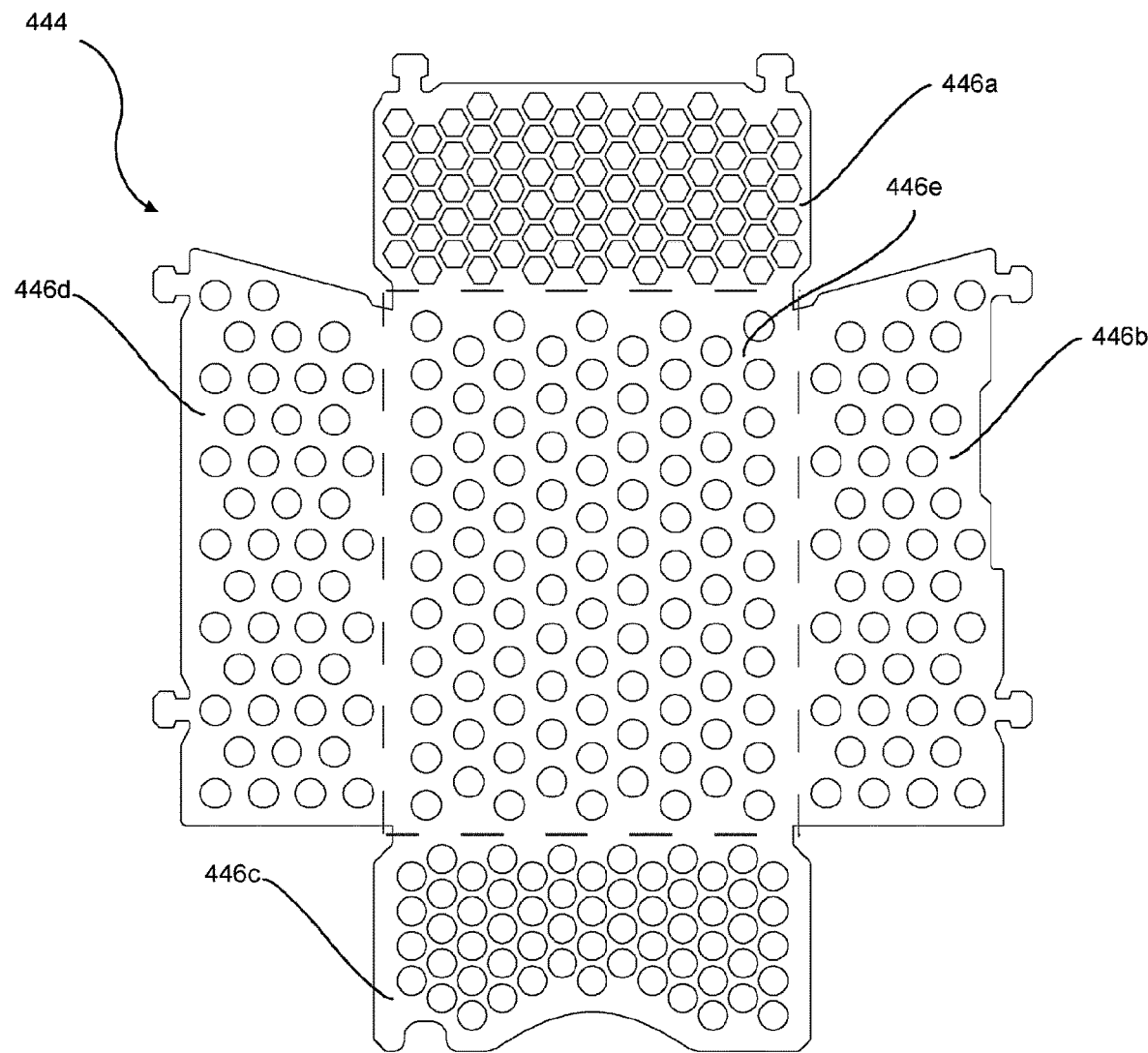
FIG. 37 is a net view of the shield of FIG. 33.
Figure 38:
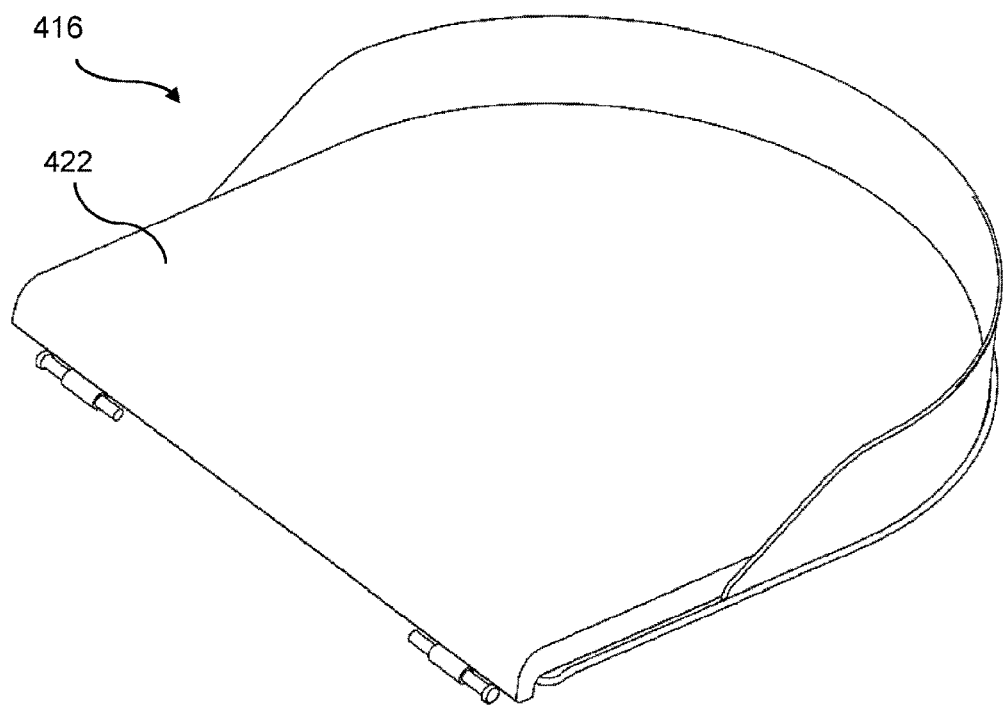
FIG. 38 is a top perspective view of a pizza deck of the cooking appliance of FIG. 31.
Figure 39:
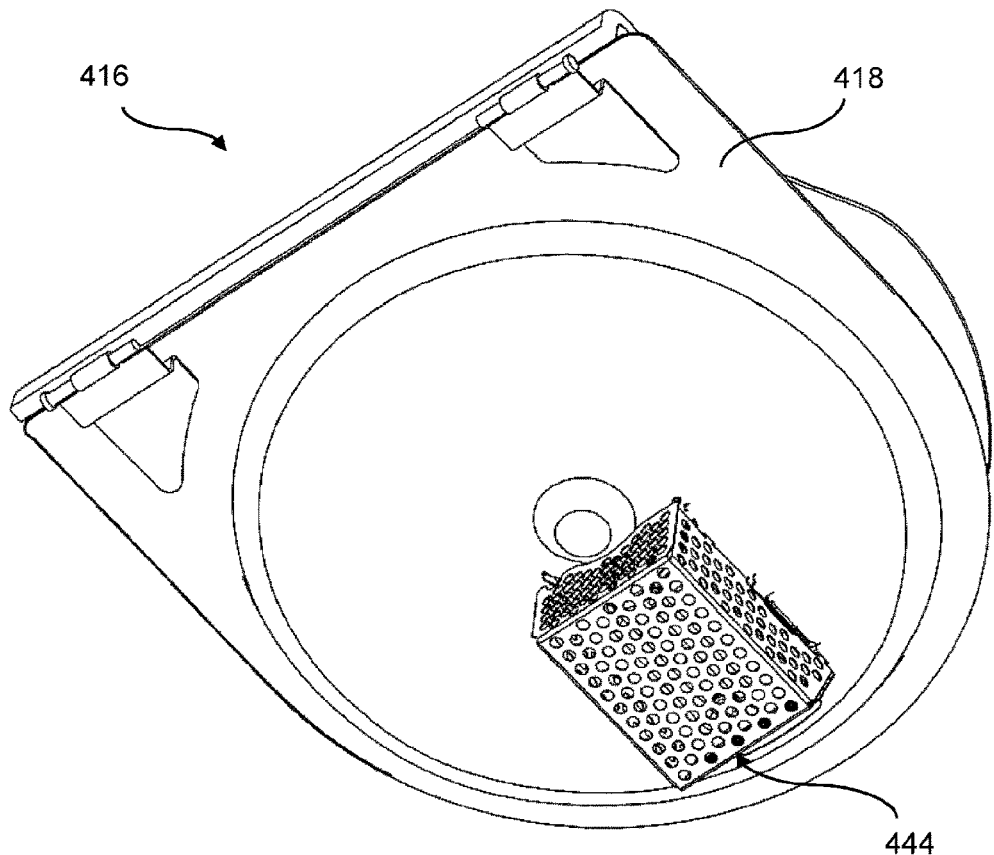
FIG. 39 is a bottom perspective view of the pizza deck of FIG. 38.
Figure 40:
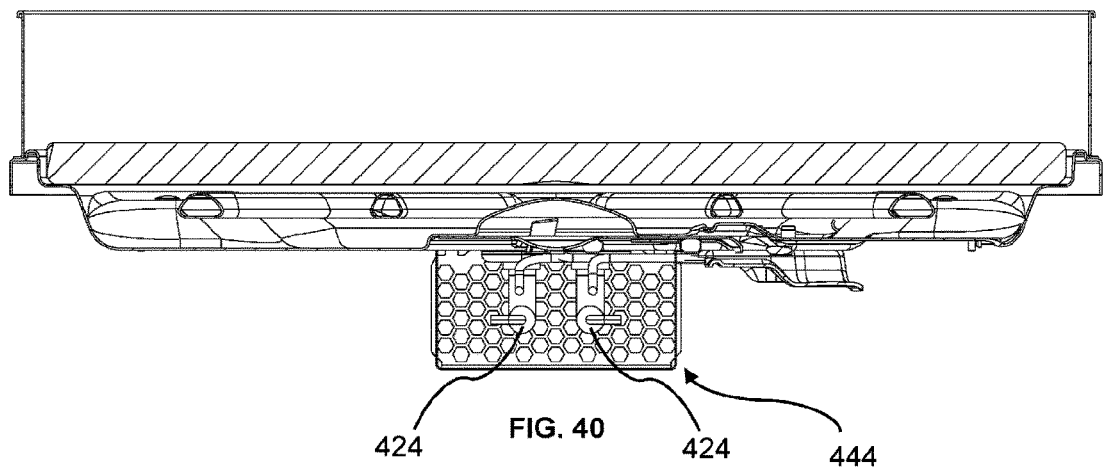
FIG. 40 is a sectioned front view taken transversely through the pizza deck and shield.

Referring to FIG. 31 and FIG. 32 of the drawings, a cooking appliance 400 according to an embodiment is illustrated. The cooking appliance 400 is configured to cook pizza (not shown).

The cooking appliance 400 includes a generally cuboidal body 402 providing a floor 404, a ceiling 406 and an intermediate wall 408 locating between the floor 404 and the ceiling 406. The floor 404, ceiling 406, and wall 408 at least partly surround a cooking cavity 410.

The body 402 has an opening 412 via which the pizza that is to be cooked can be moved in and out of the cavity 410. The opening 412 is closed by a door 414 which is hinged to the body 402 at a lower portion of the door 414.

Figure 41:
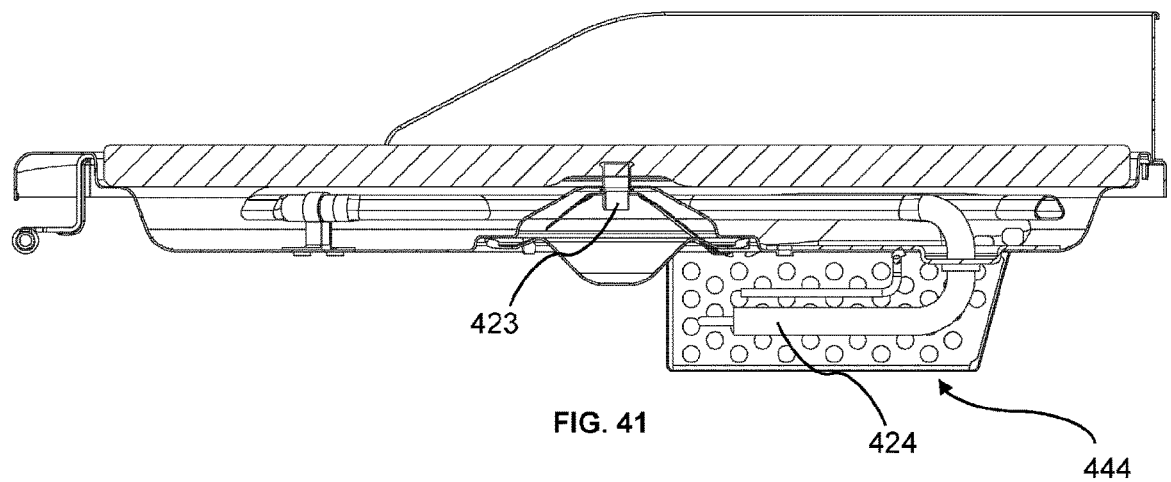
FIG. 41 is a sectioned side view taken longitudinally through the pizza deck and shield.

The cooking appliance 400 also includes a pizza deck 416 movable relative to the floor 404 for receiving the pizza. The pizza deck 416 includes a deck carriage 418 that houses a heating element 420 to deliver radiant energy to cook the pizza. The deck carriage 418 supports a cooking base 422 which is preferably made of ceramic. It will be appreciated that the cooking base 422 may be made of one or more appropriate materials. A temperature sensor 423 (FIG. 41) is located about the underside of the ceramic cooking base 422.

Figure 42:
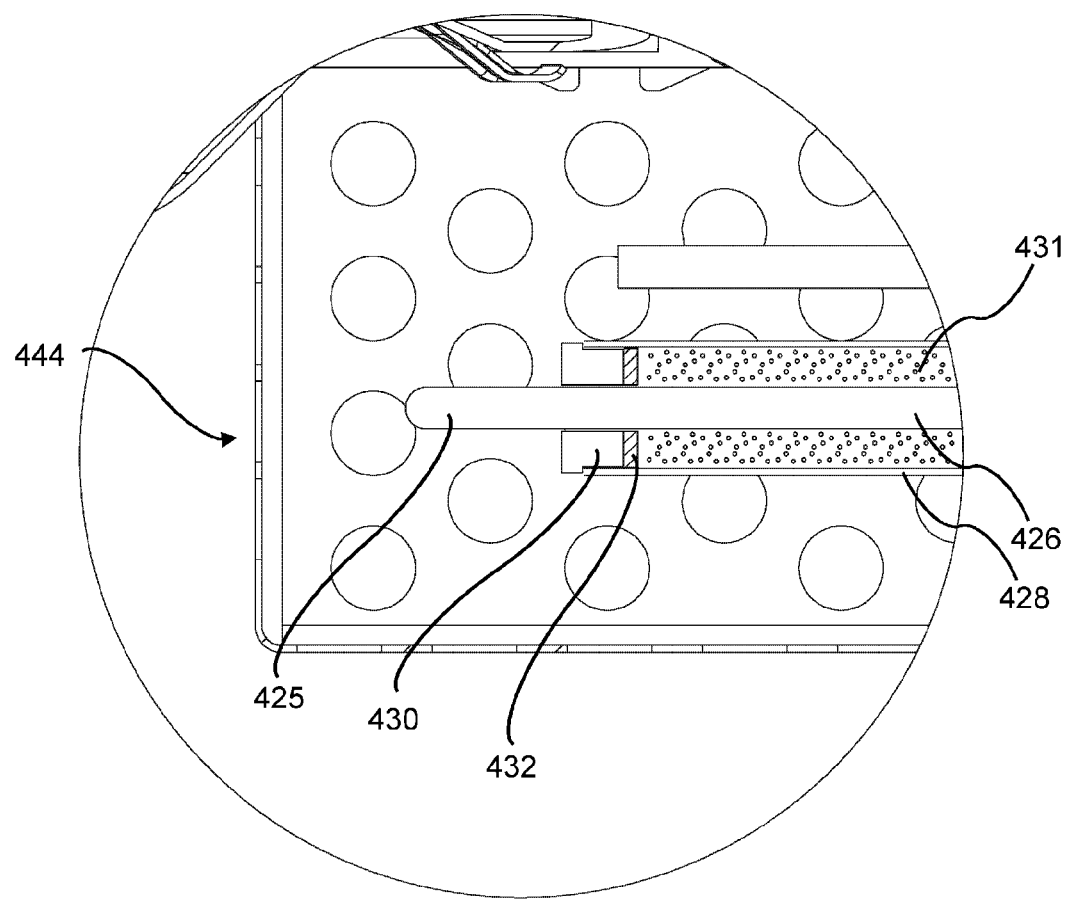
FIG. 42 is a sectioned detail view of a cold pin section of a heating element of the appliance.
Figure 43:
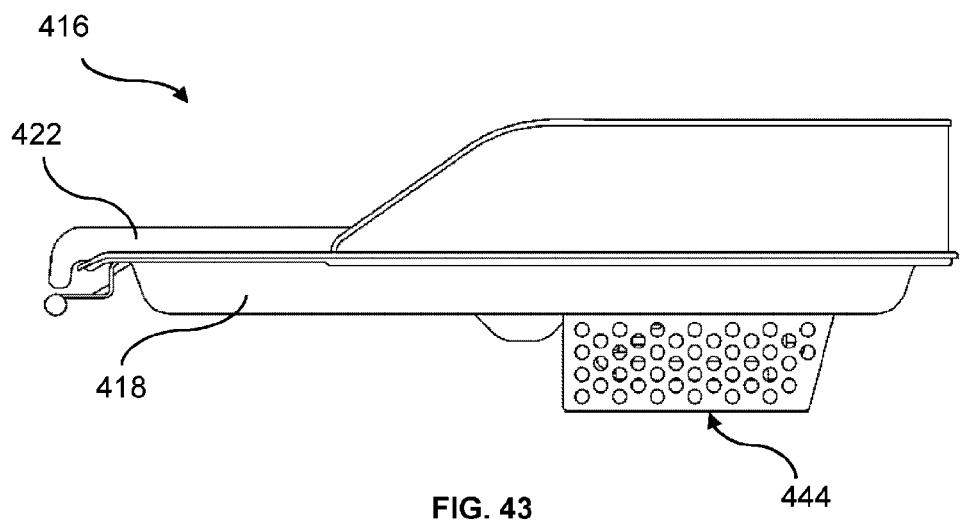
FIG. 43 is a side view of the pizza deck of FIG. 38.
Figure 44:
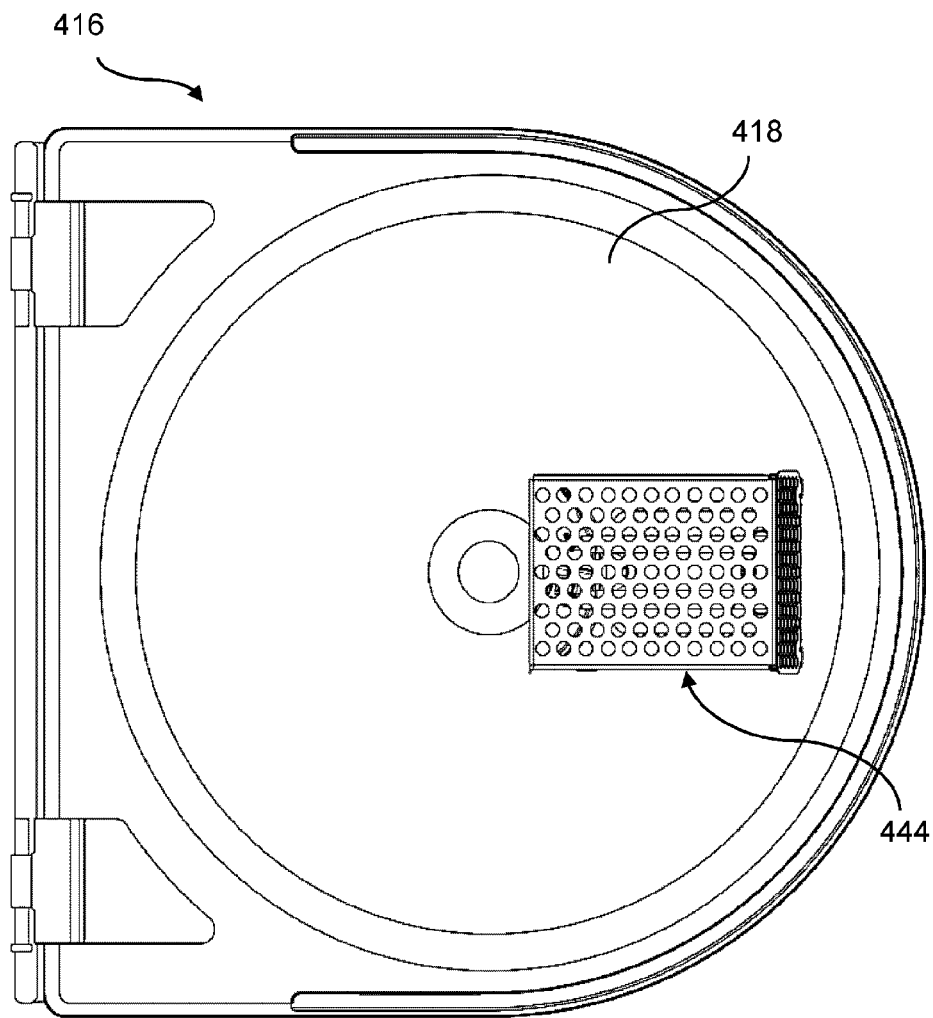
FIG. 44 is a bottom view of the pizza deck of FIG. 38.

The heating element 420 has a cold pin section which includes cold pins 424 (shown in FIG. 47) that protrude through the back of the deck carriage 418 for connection to a power source (not shown) under control of a processor module (not shown). As shown in the detail view of FIG. 42, each of the cold pins 424 includes a terminal end portion 425 to which power terminals and high-voltage wires of the power source are welded. The portion 425 is formed from an extension of the heating wire 426 of the element 420. The portion 425 is sealingly mounted to a terminal end of the sheath 428 of the element 420 by way of a ceramic or silicone mount 430. A composition of magnesium oxide powder 431 is located between the sheath 428 and the wire 426 and surrounds the wire 426 to electrically insulate the wire 426 from the sheath 428. A glass seal 432 is positioned between the mount 430 and the powder 431 and surrounds the wire 426 adjacent the end portion 425 to prevent moisture and air from contaminating the powder 431 housed within the sheath 428.

Figure 45:
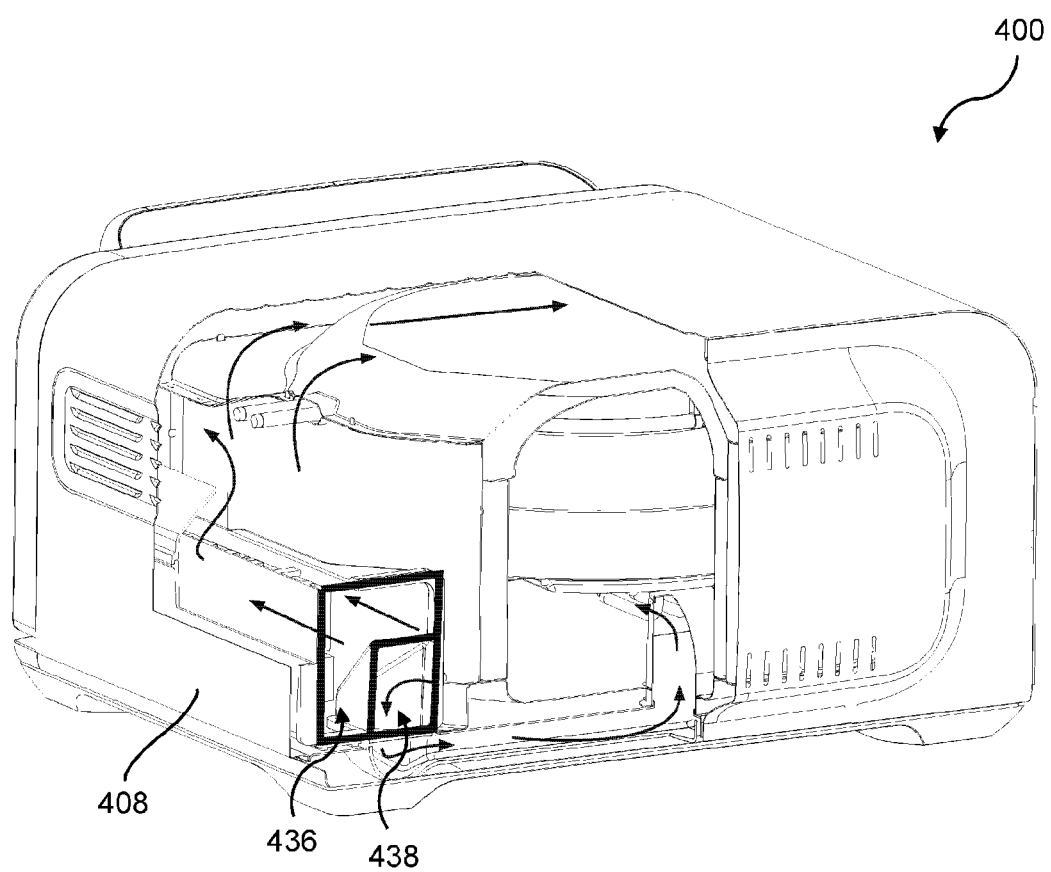
FIG. 45 is a partial sectioned rear perspective view of the appliance of FIG. 31 showing a cooling system of the appliance.
Figure 47:
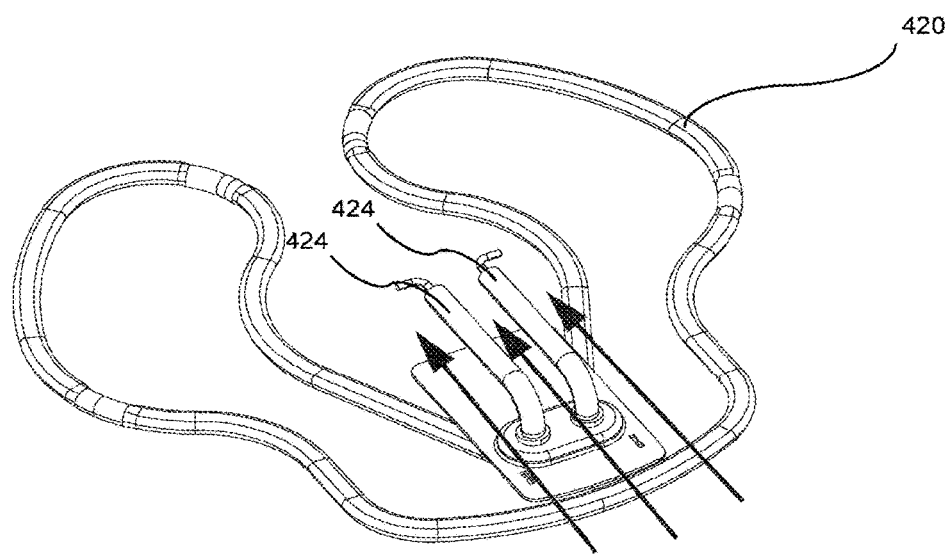
FIG. 47 is a perspective view of the heating element of the appliance of FIG. 31.
Figure 48:
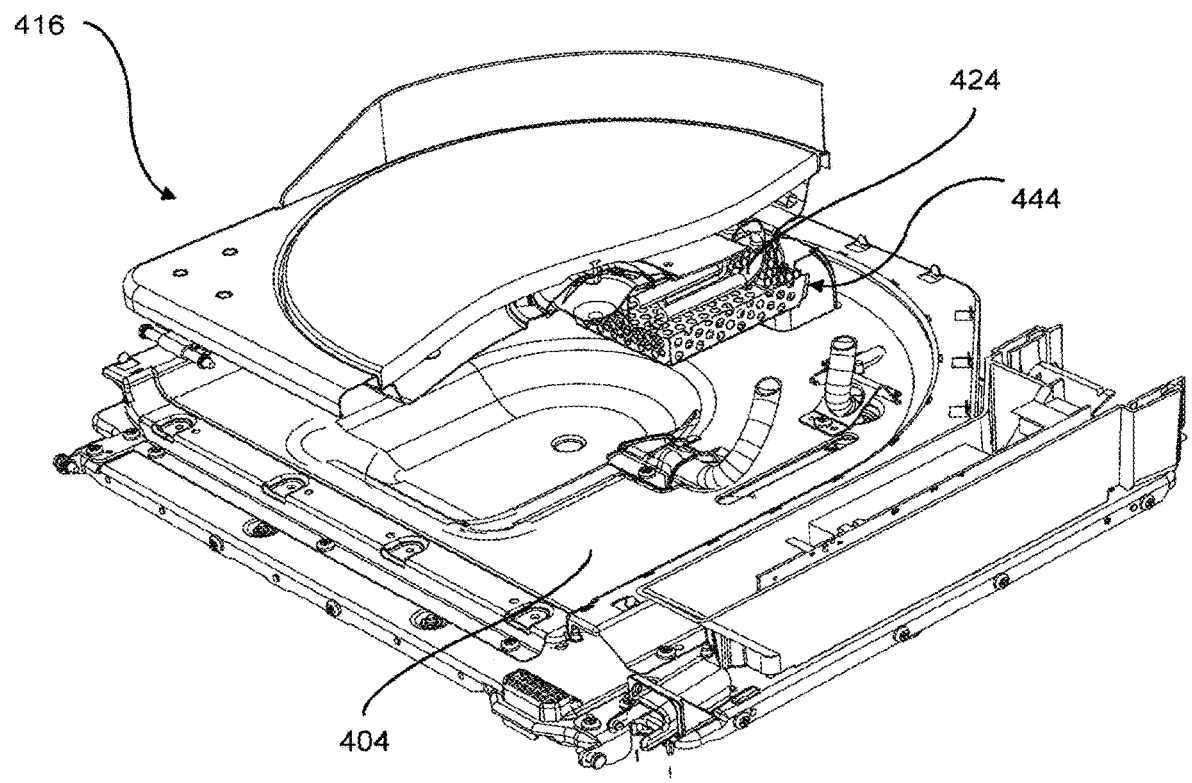
FIG. 48 is a partial sectioned perspective view of the deck and floor of the appliance of FIG. 31.
Figure 49:
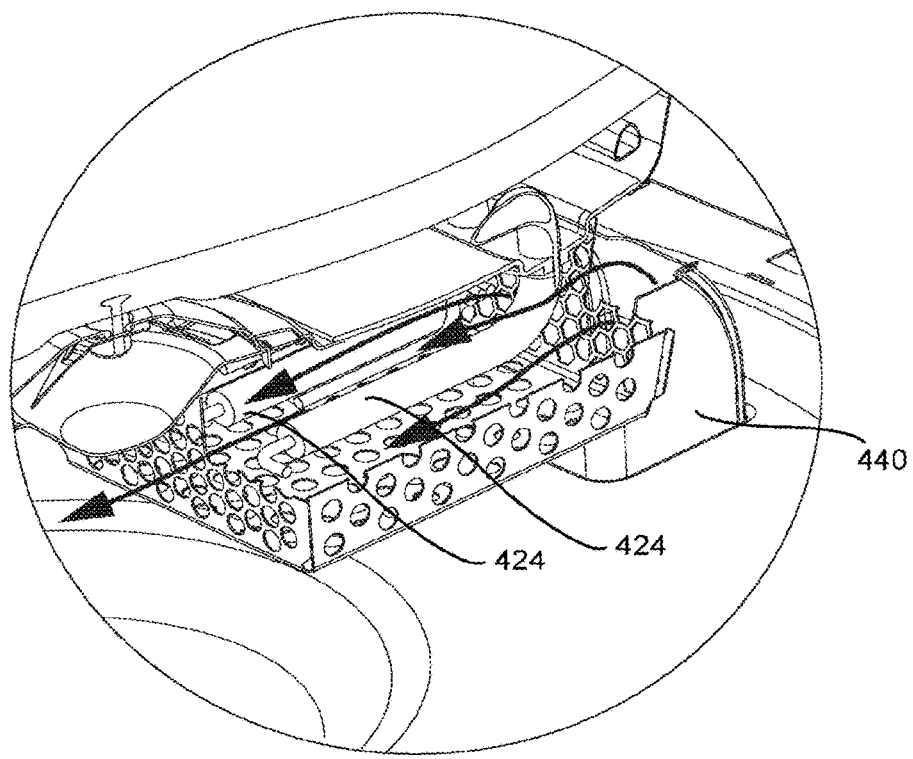
FIG. 49 is a partial sectioned detail view of the cold pin section of the appliance of FIG. 31 showing airflow to the cold pin section.
Figure 50:
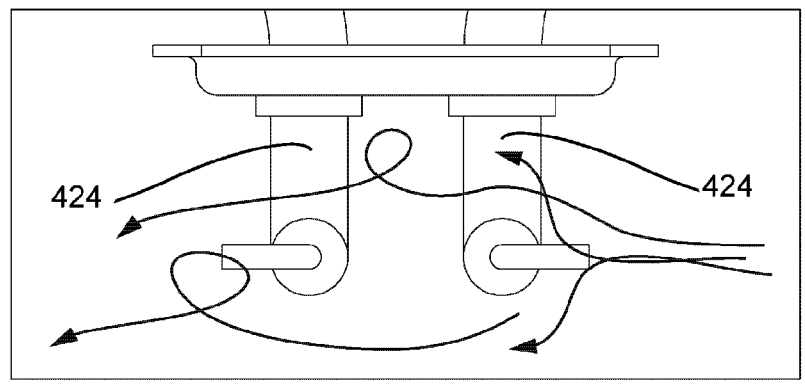
FIG. 50 is a schematic illustration of an alternative airflow path to the cold pin section.

The cooking appliance 400 includes a cooling system 434 integrated with a periphery of the body 402. The cooling system 434 includes a first airflow channel 436 and a second airflow channel 438 as shown in FIG. 45. The first airflow channel 436 communicates with a cavity of the wall 408 to cool both the cavity of the wall 408 and electronics of the appliance 400 (such as a PCB located in a floor region 405 adjacent the floor 404, and a controller located in a door region 415). The second airflow channel 438 communicates with a vent 440 that expels air and cools the cold pins 424 (and thereby the glass seal 432) of the heating element 420. In the embodiment depicted, the vent 440 is proximate the cold pins 424 when the cold pins 424 are in their home position, that is, when the door 414 closes the opening 412 of the cavity 410. The vent 440 is aligned so that its height and projection creates an airflow to target the cold pins 424. In the preferred embodiment, the airflow path (indicated by bold arrows) is generally parallel to the direction in which the cold pins 424 extend along the underside of the carriage 418 as shown in FIG. 47. FIG. 50 illustrates turbulent airflow if the vent 440 was directed toward the cold pins 424 in a transverse flow path to the direction that the cold pins 424 extend.

Figure 46:
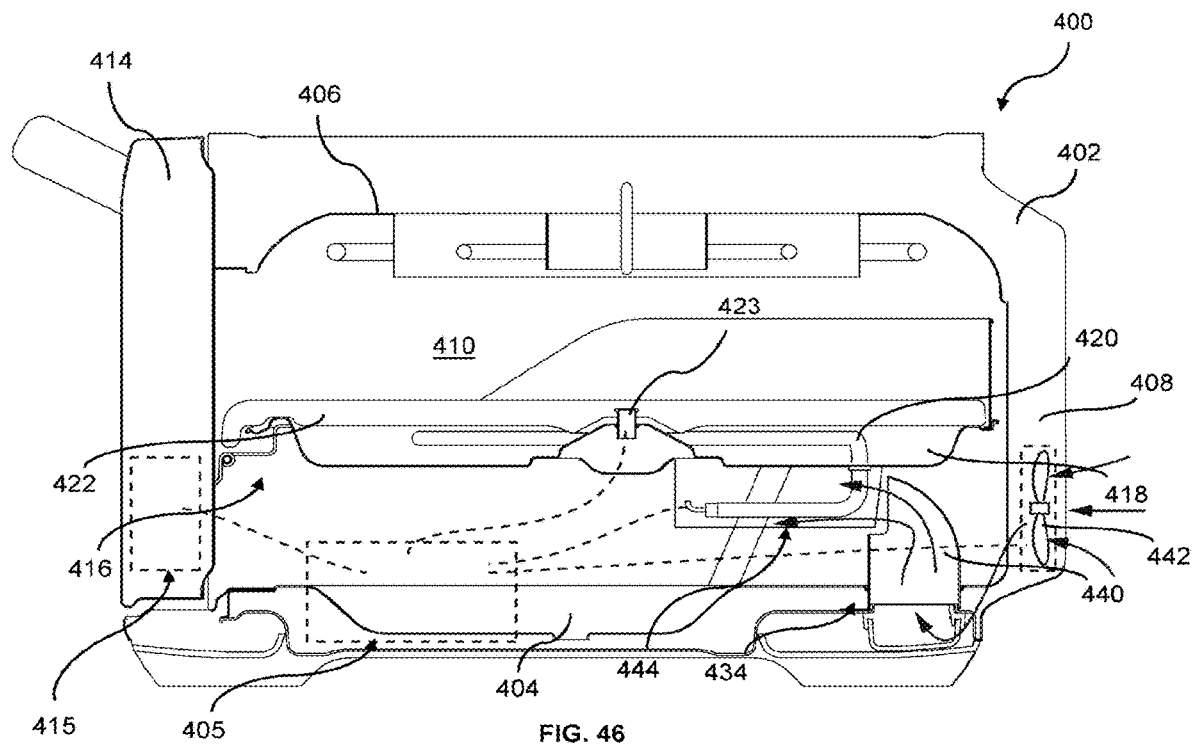
FIG. 46 is a schematic sectioned side view of the cooking appliance of FIG. 45.

As shown in FIG. 46, the air is guided by the channel 438 in the periphery under the floor 404. A fan 442 driving the air to the vent 440 is positioned away from the vent 440 to distance itself from the air in the cavity 410 which can reach temperatures of around 400° C. The fan 442 is actuated when the temperature sensor 423 records a temperature threshold above a certain point, preferably 100° C. The fan 442 turns off when the temperature sensor 423 records a temperature threshold below the certain point. The outlet of the vent 440 is positioned remote from the temperature sensor 423 so as to not influence temperature measurements of the sensor 423.

The heating element 420 can operate at approximately 700° C. which in turn causes the temperature of the cavity 410 to reach 400° C. and the temperature of the lower region below the pizza deck 416 where the cold pins 424 reside to reach in excess of 250° C. Thus, this dedicated cooling airflow to the cold pins 424 helps to prevent the cold pins 424 from being destroyed and minimises the risk of the glass seal 432 cracking.

The cooking appliance 400 also includes a shield 444 mounted to the underside of the deck carriage 418. In the preferred embodiment, the shield 444 is in the form of a metallic cage, and particularly formed from an aluminium alloy to minimise costs and to provide for a relatively lightweight construction. Although, it will be appreciated that the shield 444 may be formed of other suitable materials including, but not limited to, stainless steel, mild steel, glass, ceramics and high temperature resistance plastics.

Figure 51:
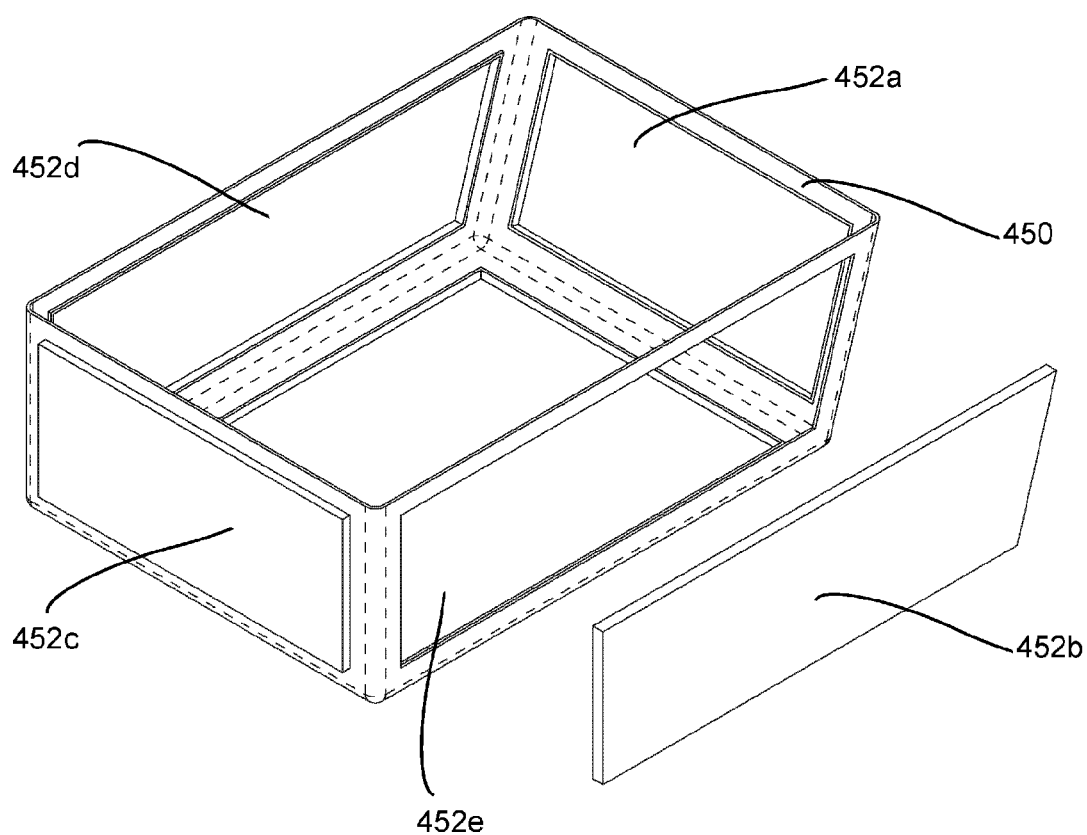
FIG. 51 is a schematic perspective view of a shield according to an alternative embodiment.

With particular reference to FIGS. 33 to 37, the shield 444 includes a plurality of perforated walls 446a-e which partly surround a cooling area 448 in which the cold pins 424 reside. Together, the walls 446a-e and underside of the carriage 418 surround the cooling area 448. One of the perforated walls 446a is configured to face the outlet of the vent 440 such that airflow from the vent 440 may reach the cooling area 448 whilst the walls 446a-e simultaneously block and/or trap at least a portion of the airflow from the vent 440 from reaching the cavity 410. In the embodiment depicted, the wall 446a is inclined relative to the other walls 446b-e. In the embodiment depicted, the walls 446a-e are planar and form a generally cuboidal body of the shield 444. It will be appreciated, however, that other configurations of the walls 446a-e may be envisaged. In a preferred embodiment, the total surface area of the perforations of the wall 446a which faces the outlet of the vent 440 is approximately 1340 mm² whilst the total surface area of the perforations of the remaining walls 446 is approximately 5640 mm². In an alternative embodiment, the shield 444 may include a frame 450 (FIG. 51) having a plurality of frame wall inserts 452. Each of the inserts 452 may be in the form of a pre-perforated mesh (perforations of the inserts 452 not shown).

The shield 444 has a primary purpose and a secondary purpose. It will be appreciated that the terms "primary" and "secondary" are used merely as labels, and are not intended to impose numerical requirements on or to establish a certain ranking of importance of their objects.

The primary purpose of the shield 444 is to limit user access to the cold pins 424 for safety purposes.

The secondary purpose of the shield 444 is to confine the cooling of the cold pins 424 to the cooling area 448 so that the cold air from the vent 440 is substantially blocked or trapped by the shield 444 from reaching the cavity 410. This in turn reduces or inhibits the airflow from the vent 440 to the cavity 410 to minimise flow of heat from hot to cold, with cold being in a larger area, so that the temperature of the cavity 410 is not substantially adversely affected by the cold air from the vent 440.

In an embodiment, because of the shield 444, the temperature in the cavity 410 of the cooking appliance 400 can be increased by at least 10° C. and at a faster rate, compared to an arrangement in which there is no shield 444. This is particularly advantageous since this increase in temperature of the cavity 410 is independent of power drawn by the heating element 420. Thus, the power expense is the same, yet a temperature that is reached is higher than an arrangement where the shield 444 is absent, meaning the pizza can be cooked faster with the same amount of power.

Although the invention has been described with reference to a preferred embodiment, it will be appreciated by those persons skilled in the art that the invention may be embodied in many other forms.

The invention claimed is:

1. A cooking appliance having a heating element assembly to provide heat to a cooking cavity of the cooking appliance, the heating element assembly including:
   a first heating element, a second heating element, and a third heating element;
   the first and third heating elements at least partially surrounding an area within which the second heating element is located;
   each of the heating elements including a first terminal end portion, a second terminal end portion, and a length extending between the first and second terminal end portions of the respective heating elements;
   the length of each of the first and third heating elements including:
      a respective first length portion extending along a single associated circular arcuate path between the respective first terminal end portion and a respective end portion, the single associated circular arcuate path extending from the respective first terminal end portion all the way to the respective end portion, and
      a respective second length portion extending along a single associated circular arcuate path between the respective second terminal end portion and the respective end portion the single associated circular arcuate path extending all the way from the respective second terminal end portion to the respective end portion, wherein:
      the respective end portion being located between so as to connect respective first and second length portions; and
   the single associated circular arcuate path of the respective first length portion and the single associated circular arcuate path of the respective second length portion follow a curvature of the circular second heating element and the respective first length portion is located adjacent and generally parallel to the respective second length portion.

2. The appliance of claim 1, wherein the respective end portions are arcuate end portions.

3. The appliance of claim 2, wherein the length of the third heating element is greater than the length of the first heating element.

4. The appliance of claim 3, wherein the arcuate end portion of the first heating element is opposite the arcuate end portion of the third heating element, with the arcuate end portion of the first heating element being spaced from the arcuate end portion of the third heating element.

5. The appliance of claim 4, wherein the second heating element provides an inner heating element sub-assembly and the first and third heating elements provide an outer heating element sub-assembly that is concentric with respect to the inner heating element sub-assembly.

6. The appliance of claim 1, wherein the first length portion and second length portion are located without another heating element between the first length portion and the second length portion.

7. The appliance of claim 1, further having a pizza deck comprising a substantially circular configuration having a planar upper surface and a planar lower surface.

\* \* \* \* \*